(12) United States Patent
Watanabe

(10) Patent No.: US 8,751,109 B2
(45) Date of Patent: Jun. 10, 2014

(54) VEHICLE BEHAVIOR CONTROLLING APPARATUS

(75) Inventor: Ryochi Watanabe, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/001,153

(22) PCT Filed: Jul. 17, 2009

(86) PCT No.: PCT/JP2009/003381
§ 371 (c)(1),
(2), (4) Date: Dec. 23, 2010

(87) PCT Pub. No.: WO2011/007396
PCT Pub. Date: Jan. 20, 2011

(65) Prior Publication Data
US 2011/0130923 A1    Jun. 2, 2011

(51) Int. Cl.
*B62D 15/02*    (2006.01)
*B60T 8/1755*    (2006.01)

(52) U.S. Cl.
USPC .............................. 701/41; 303/20; 303/191

(58) Field of Classification Search
USPC ........................................................ 303/20
See application file for complete search history.

(56) References Cited

U.S. PATENT DOCUMENTS

| 5,646,849 | A | * | 7/1997 | Walenty et al. | 701/70 |
| 5,671,143 | A | * | 9/1997 | Graber | 701/72 |
| 6,205,375 | B1 | | 3/2001 | Naito | |
| 6,278,930 | B1 | | 8/2001 | Yamada et al. | |
| 6,416,141 | B1 | * | 7/2002 | Zinnkann et al. | 303/191 |
| 6,572,202 | B2 | | 6/2003 | Watanabe | |
| 6,654,674 | B2 | | 11/2003 | Lu et al. | |

(Continued)

FOREIGN PATENT DOCUMENTS

| CN | 101321654 A | 12/2008 |
| DE | 103 25 486 A1 | 1/2004 |

(Continued)

OTHER PUBLICATIONS

Machine translation of JP 2006-298211.A from www4.ipdl.inpit.go.jp.*

(Continued)

*Primary Examiner* — John R Olszewski
*Assistant Examiner* — Jean-Paul Cass
(74) *Attorney, Agent, or Firm* — Oblon, Spivak, McClelland, Maier & Neustadt, L.L.P.

(57) ABSTRACT

A vehicle behavior controlling apparatus includes a steering state determining unit that determines a state of a steering by a driver, and a brake device controlling unit that executes a stabilization braking in which predetermined braking force is generated on a front wheel at a side reverse to a steering direction by a second steering during a turning-back steering, when it is determined that the steering angle in the second steering is held when the turning-back steering is executed by the steering state determining unit, and when it is determined that the steering angle in the second steering is held, a limitation is imposed on an amount of a reduction in the braking force. Thus, a yaw moment in the direction reverse to the yaw moment by the second steering in the turning-back steering can be generated, whereby the yaw moment due to the steering can be reduced.

7 Claims, 10 Drawing Sheets

(56) References Cited

U.S. PATENT DOCUMENTS

| | | | |
|---|---|---|---|
| 7,006,901 B2* | 2/2006 | Wang | 701/1 |
| 7,006,907 B2* | 2/2006 | Usuki et al. | 701/51 |
| 7,240,971 B2 | 7/2007 | Yasui et al. | |
| 7,308,350 B2* | 12/2007 | Brown et al. | 701/70 |
| 7,409,280 B2* | 8/2008 | Nakamura et al. | 701/70 |
| 7,522,983 B2* | 4/2009 | Hashimoto et al. | 701/48 |
| 7,630,816 B2 | 12/2009 | Yasutake et al. | |
| 7,762,562 B2* | 7/2010 | Sugiyama | 280/5.509 |
| 8,600,638 B2 | 12/2013 | Kato | |
| 2002/0082762 A1* | 6/2002 | Tanaka et al. | 701/70 |
| 2002/0109403 A1* | 8/2002 | Yamamoto et al. | 303/146 |
| 2002/0183911 A1* | 12/2002 | Tashiro et al. | 701/48 |
| 2003/0102713 A1 | 6/2003 | Murakami | |
| 2003/0218378 A1 | 11/2003 | Tanaka et al. | |
| 2004/0098185 A1* | 5/2004 | Wang | 701/70 |
| 2004/0117085 A1 | 6/2004 | Lu et al. | |
| 2005/0027402 A1 | 2/2005 | Koibuchi et al. | |
| 2005/0029754 A1 | 2/2005 | Ueno et al. | |
| 2005/0075778 A1 | 4/2005 | Inagaki | |
| 2006/0267404 A1* | 11/2006 | Yasui et al. | 303/146 |
| 2007/0138861 A1* | 6/2007 | Kawahara et al. | 303/20 |
| 2007/0169007 A1* | 7/2007 | Hashimoto et al. | 717/136 |
| 2007/0213900 A1 | 9/2007 | Raab | |
| 2007/0282510 A1* | 12/2007 | Nimmo et al. | 701/70 |
| 2008/0007115 A1 | 1/2008 | Mizutani | |
| 2008/0215223 A1* | 9/2008 | Yamada et al. | 701/81 |
| 2008/0300764 A1* | 12/2008 | Kato et al. | 701/75 |
| 2009/0012685 A1 | 1/2009 | Maeda et al. | |
| 2009/0051216 A1 | 2/2009 | Maeda et al. | |
| 2009/0072615 A1 | 3/2009 | Oosawa et al. | |
| 2009/0118905 A1* | 5/2009 | Takenaka et al. | 701/41 |
| 2010/0106374 A1* | 4/2010 | Miyajima et al. | 701/41 |
| 2011/0125368 A1* | 5/2011 | Yokota | 701/41 |
| 2011/0241418 A1* | 10/2011 | Nozawa et al. | 303/3 |
| 2011/0246041 A1* | 10/2011 | Kato | 701/70 |
| 2012/0074770 A1* | 3/2012 | Lee | 303/20 |

FOREIGN PATENT DOCUMENTS

| | | |
|---|---|---|
| EP | 1 388 474 A2 | 2/2004 |
| EP | 1 495 931 A2 | 1/2005 |
| JP | 11-255093 | 9/1999 |
| JP | 2000-52963 | 2/2000 |
| JP | 2000-168524 | 6/2000 |
| JP | 2001-47989 | 2/2001 |
| JP | 2002 127887 | 5/2002 |
| JP | 2004-25916 | 1/2004 |
| JP | 2006-193038 | 7/2006 |
| JP | 2006-213141 | 8/2006 |
| JP | 2006-240395 | 9/2006 |
| JP | 2006 298211 | 11/2006 |
| JP | 2007 513002 | 5/2007 |
| JP | 2008 254724 | 10/2008 |
| WO | WO 2005/063537 A1 | 7/2005 |
| WO | WO 2006/006453 A1 | 1/2006 |
| WO | WO 2006/019246 A2 | 2/2006 |

OTHER PUBLICATIONS

International Search Report Issued Oct. 27, 2009 in PCT/JP09/003381 filed Jul. 17, 2009.

Office Action mailed Feb. 15, 2012, in co-pending U.S. Appl. No. 12/674,703.

Office Action mailed Aug. 13, 2012, in co-pending U.S. Appl. No. 12/674,703.

Office Action mailed Oct. 25, 2012, in co-pending U.S. Appl. No. 13/133,535.

Notice of Allowance mailed Dec. 26, 2012, in co-pending U.S. Appl. No. 13/133,535.

Notice of Allowance mailed Sep. 27, 2013, in co-pending U.S. Appl. No. 13/133,535.

* cited by examiner

VEHICLE BEHAVIOR CONTROLLING APPARATUS

CROSS-REFERENCE TO RELATED APPLICATIONS

This application claims priority to PCT/JP2009/003381, filed Jul. 17, 2009.

FIELD

The present invention relates to a vehicle behavior controlling apparatus. Particularly, the present invention relates to a vehicle behavior controlling apparatus that controls a behavior of a vehicle by controlling braking force generated on wheels.

BACKGROUND

In conventional vehicle behavior controlling apparatuses, there are those that controls braking force generated on wheels so as to control braking force of the wheels according to the driving condition of the vehicle, regardless of a driver's intention during when the vehicle travels, whereby stability during the travel of the vehicle is secured. As the control of the behavior of the vehicle described above, when a control deviation of a yaw rate exceeds a predetermined threshold value during the turn of the vehicle, braking force is generated on a front wheel at the outside of the curve, whereby the yaw rate is reduced to stabilize the behavior.

In a brake device used for stabilizing the behavior of the vehicle as described above, oil pressure is generated by a hydraulic pump, and various valves are operated to apply the oil pressure generated by the hydraulic pump to a wheel cylinder mounted in the vicinity of a wheel, whereby braking force is generated on the wheel. However, when the braking force is generated on the wheel, it is necessary to start the hydraulic pump or operate the valves. Therefore, a time lag tends to occur until the braking force is actually generated after the instruction of generating the braking force.

On the other hand, when braking force is generated on the wheel in order to stabilize the behavior by the vehicle behavior controlling apparatus, braking force should be generated as rapidly as possible in order to stabilize the unstable behavior such as spin mode or the behavior of the vehicle not caused by the driving operation. When the braking force is delayed, the control for stabilization is also delayed. Therefore, some of the conventional vehicle behavior controlling apparatuses prevent the delay in the braking force for stabilizing the behavior of the vehicle.

For example, in a vehicle stabilized driving dynamic control apparatus described in Patent Literature 1, when it is estimated that braking force is generated on a wheel in order to stabilize the behavior during the turn of the vehicle, preparatory brake pressure that is a brake oil pressure of a low level is applied beforehand to the wheel on which the braking force is estimated to be generated. With this process, when braking force is generated on the wheel, such as the front wheel at the outside of a curve, which can stabilize the behavior through the generation of the braking force, in case where the behavior of the vehicle becomes unstable during the turn, the oil pressure, which is to be exerted on the wheel cylinder of the wheel, can be increased in a short period to allow effective braking force to be generated as rapidly as possible, whereby the behavior can be stabilized.

There may be the case in which a so-called turning-back steering, where a vehicle turns in one of the right and left directions and then, turns in a reverse direction, such as the case of changing a driving lane or fishhook steering, is executed during the travel of the vehicle. The unstable behavior such as spin mode might occur not only when the first steering is executed but also when the second steering in the turning-back steering is executed. Therefore, in the vehicle stabilized driving dynamic control apparatus described in Patent Literature 1, the preparatory brake pressure is applied even when the turning-back steering is executed. Specifically, when it is determined that the vehicle is steered in one of the right and left directions, and then, steered in the reverse direction, the preparatory brake pressure is applied to the front wheel at the outside in the turning direction of the second steering. With this, the braking force is generated by the front wheel at the outside as rapidly as possible, even if the behavior of the vehicle becomes unstable in the second steering, whereby the behavior can be stabilized.

CITATION LIST

Patent Literature

Patent Literature 1: Japanese translation of PCT international application No. 2007-513002

SUMMARY

Technical Problem

Since the preparatory brake pressure is applied when the stabilization in the behavior of the vehicle is aimed during the turning, the control for performing the stabilization control prevents the delay. However, in the vehicle stabilized driving dynamic control apparatus described in Patent Literature 1, the preparatory brake pressure is eliminated, in case where the brake control for stabilizing the behavior during the turn is not executed within a predetermined period when the second steering in the turning-back steering is executed.

However, when the turning-back steering is executed, the vehicle behavior is changed from the turning state in one direction to the turning state in the reverse direction, so that a yaw moment tends to be increased, compared to the case in which the vehicle behavior is changed from the state of going straight to the turning state. Specifically, when the turning-back steering is executed, a suspension at the outside of the turn that sinks in the first steering expands because of the second steering. However, the suspension is located at the inside of the turn in the second steering, so that when the suspension expands, the roll moment during the turn in the second steering increases at once. Since the steering direction in the second steering is reverse to the steering direction in the first steering, the steering angle with respect to the advancing direction of the vehicle, which is turning by the first steering, increases. Accordingly, lateral force is easy to be generated on the wheel, and the yaw moment is easy to excessively increase in the second steering.

As described above, the yaw moment tends to increase in the second steering during the turning-back steering. In the vehicle stabilized driving dynamic control apparatus described in Patent Literature 1, the preparatory brake pressure is applied when the second steering in the turning-back steering is performed, and after the lapse of the predetermined period, the preparatory brake pressure is eliminated. However, the yaw moment tends to increase in the second steering during the turning-back steering, so that when the behavior becomes unstable even by applying the preparatory pressure is, the behavior might not effectively be stabilized.

The present invention is accomplished in view of the foregoing problem, and aims to provide a vehicle behavior controlling apparatus capable of enhancing stability in the behavior during the turning-back steering.

Solution to Problem

In order to solve the above mentioned problem and achieve the object, a vehicle behavior controlling apparatus according to the present invention includes a steering state determining means that determines a state of a steering by a driver; and a brake device controlling means that is provided to be capable of controlling braking force by controlling a brake device generating the braking force on a wheel, and that executes a stabilization braking in which, when it is determined that a turning-back steering is executed by a determination at the steering state determining means, the brake device controlling means generates a predetermined braking force on a front wheel at a side reverse to a steering direction by a second steering during the turning-back steering, and when it is determined that a steering angle in the second steering is held by the steering state determining means, the brake device controlling means imposes a limitation on an amount of a reduction in the braking force.

In addition, in the vehicle behavior controlling apparatus according to the present invention, the steering state determining means determines that a steering angle in the second steering during the turning-back steering is held, when the turning-back steering is executed, the steering angle is greater than a predetermined value, and a change of the steering angle is less than a predetermined change, and the brake device controlling means executes the stabilization braking during when a steering angle in the second steering is held.

In addition, in the vehicle behavior controlling apparatus according to the present invention, the brake device controlling means compares a current control amount in a control of the current stabilization braking and a previous control amount of the current control amount in the current stabilization braking, and selects the greater control amount as the current control amount, thereby maintaining the braking force, when the stabilization braking is executed.

In addition, in the vehicle behavior controlling apparatus according to the present invention, the brake device controlling means sets a lower limit value of the control amount for the stabilization braking, and sets the control amount in a control of the stabilization braking to be not less than the lower limit value, thereby maintaining the braking force, when the stabilization braking is executed.

In addition, in the vehicle behavior controlling apparatus according to the present invention, the vehicle behavior controlling apparatus further includes a yaw rate acquiring means that can acquire a yaw rate during a travel of the vehicle, wherein the brake device controlling means, during when the stabilization braking is executed, ends the stabilization braking when the yaw rate acquired by the yaw rate acquiring means during the stabilization braking is reduced from a peak value of the yaw rate by a predetermined amount or more.

Advantageous Effects of Invention

The vehicle behavior controlling apparatus according to the present invention provides an effect that the stability in the behavior during the turning-back steering can be enhanced.

BRIEF DESCRIPTION OF DRAWINGS

FIG. 5-1 is a flowchart illustrating a procedure of the vehicle behavior controlling apparatus according to the first embodiment.

FIG. 5-2 is a flowchart illustrating a procedure of the vehicle behavior controlling apparatus according to the first embodiment.

FIG. 7-1 is a flowchart illustrating a procedure of the vehicle behavior controlling apparatus according to the second embodiment.

FIG. 7-2 is a flowchart illustrating a procedure of the vehicle behavior controlling apparatus according to the second embodiment.

FIG. 7-3 is a flowchart illustrating a procedure of the vehicle behavior controlling apparatus according to the second embodiment.

DESCRIPTION OF EMBODIMENTS

Embodiments of a vehicle behavior controlling apparatus according to the present invention will be described in detail with reference to the drawings. It is to be noted that the invention is not limited by the embodiments. Further, the components in the embodiments described below include those that can easily be replaced by a person skilled in the art or those substantially the same.

First Embodiment

Figure 1:
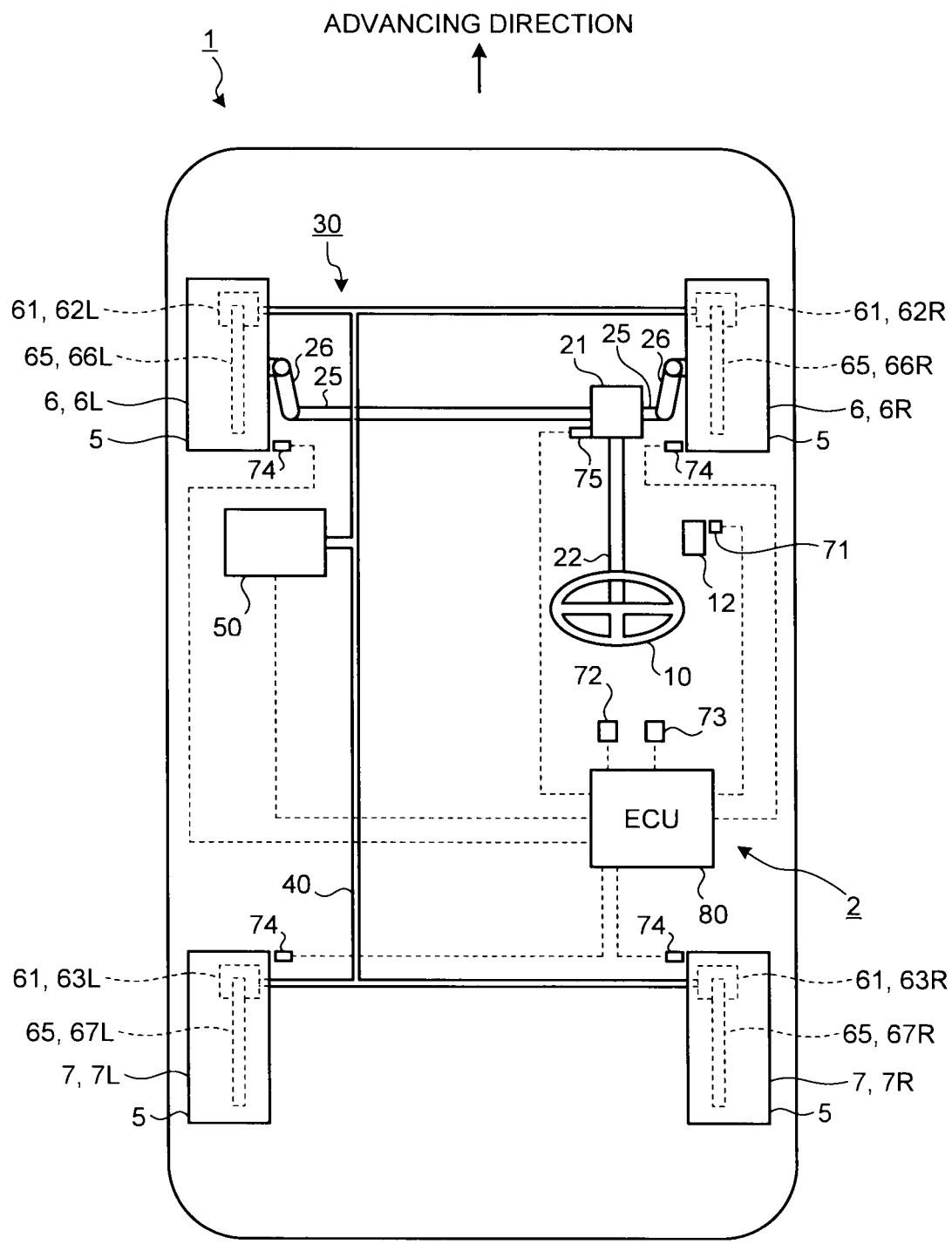
FIG. 1 is a schematic diagram illustrating a vehicle provided with a vehicle behavior controlling apparatus according to a first embodiment of the present invention.

FIG. 1 is a schematic diagram illustrating a vehicle provided with a vehicle behavior controlling apparatus according to the first embodiment of the present invention. A vehicle 1 provided with a vehicle behavior controlling apparatus 2 according to the first embodiment employs an engine (not illustrated) serving as an internal combustion engine as a power source, and power generated by the power source is transmitted to a wheel 5, among plural wheels 5, which is mounted as a driving wheel, through a power transmission path such as a transmission (not illustrated). Specifically, when the vehicle 1 is a front-wheel-drive vehicle, power is transmitted to a front wheel 6, while in the case of a rear-wheel-drive vehicle, power is transmitted to a rear wheel 7. In the case of a four-wheel-drive vehicle, power is transmitted to all wheels 5. Thus, the driving wheel to which the power is transmitted generates driving force, whereby the vehicle 1 can travel with this driving force. The power source may be the one other than the engine. For example, a motor (not illustrated) operated with electricity may be used, or an engine and a motor may both be used.

The front wheels 6 among the plural wheels 5 provided to the vehicle 1 are mounted as steered wheels of the vehicle 1. The front wheels 6 serving as the steered wheels are mounted so as to be steerable by a steering wheel 10 mounted at a driver's seat of the vehicle 1. The steering wheel 10 is coupled to an EPS (Electric Power Steering) apparatus 21, which is a steering auxiliary apparatus generating steering auxiliary force when a driver of the vehicle 1 steers the wheel 5, through a steering shaft 22. Since the steering wheel 10 is coupled to the EPS device 21 as described above, the front wheel 6 can be steered by the operation of the steering wheel 10. Specifically, a front-left wheel 6L, which is the front wheel 6 located at the left with respect to the advancing direction of the vehicle 1, and a front-right wheel 6R, which is the front wheel 6 located at the right with respect to the advancing direction of the vehicle 1, are coupled to the EPS device 21 through a tie rod 25 and a knuckle arm 26, whereby the front-left wheel 6L and the front-right wheel 6R are steerable by operating the steering wheel 10. The EPS device 21 is also provided with a steering angle sensor 75 serving as a steering angle detecting means for detecting a steering angle that is the turning angle of the steering wheel 10.

The vehicle 1 is also provided with a brake device 30 that generates braking force on the wheel 5. In the vicinity of the respective wheels 5, wheel cylinders 61 that are provided to the brake device 30 and operated by oil pressure, and brake disks 65 that are mounted with the wheel cylinders 61 as a set and that rotate integral with the wheels 5 when the wheels 5 turn, are provided. Specifically, the wheel cylinders 61 are mounted such that the wheel cylinders 61 provided in the vicinity of the front-left wheel 6L, front-right-wheel 6R, rear-left wheel 7L, and rear-right wheel 7R are respectively defined as a front-left wheel cylinder 62L, front-right wheel cylinder 62R, rear-left wheel cylinder 63L, and rear-right wheel cylinder 63R. Similarly, the brake disks 65 are mounted such that the brake disks 65 provided in the vicinity of the front-left wheel 6L, front-right wheel 6R, rear-left wheel 7L, and rear-right wheel 7R are respectively defined as a front-left wheel brake disk 66L, front-right wheel brake disk 66R, rear-left wheel brake disk 67L, and rear-right wheel brake disk 67R.

Each of the wheel cylinders 61 is connected to a hydraulic path 40 that is a path of oil pressure exerted on the wheel cylinder 61 when the vehicle 1 is stopped. A brake actuator 50 that can control the oil pressure in the hydraulic path 40 upon the braking of the vehicle 1 is provided on the hydraulic path 40, wherein the brake actuator 50 can independently exert the oil pressure, which is exerted on each wheel cylinder 61. Thus, the braking force of each of the plural wheels 5 can be independently generated.

A wheel speed sensor 74 serving as a wheel speed detecting means for detecting a wheel speed that is the rotation speed of the wheel 5 is provided in the vicinity of each wheel 5. The wheel speed sensor 74 is provided independently on each wheel 5, and it can independently detect the wheel speed of each wheel 5.

The vehicle 1 is also provided with a brake pedal 12, which is operated when the driving vehicle 1 is stopped, in the vicinity of a foot of a driver who is seated in the driver's seat on the vehicle 1. The brake pedal 12 is connected to the hydraulic path 40 through a later-described master cylinder 31 (see FIG. 2). A brake stroke sensor 71 serving as a brake stroke detecting means that can detect a stroke of the brake pedal 12 is provided in the vicinity of the brake pedal 12.

The brake device 30 can generate braking force on the wheels 5 when the driver of the vehicle 1 depresses the brake pedal 12 to perform the braking operation. As described above, the brake device 30 is provided as a braking means that can generate braking force on the wheels 5 of the vehicle 1 through at least the braking operation by the driver.

The vehicle 1 is also provided with a G sensor 73 that can detect at least the acceleration of the vehicle 1 in the width-wise direction and a yaw rate sensor 72 that is a yaw rate detecting means capable of detecting a yaw rate during the travel of the vehicle 1. The brake stroke sensor 71, the yaw rate sensor 72, the G sensor 73, the wheel speed sensor 74, the steering angle sensor 75, the EPS device 21, and the brake actuator 50 are connected to an ECU (Electronic Control Unit) 80 that controls the respective units of the vehicle 1, and they are mounted so as to be controllable by the ECU 80.

Figure 2:
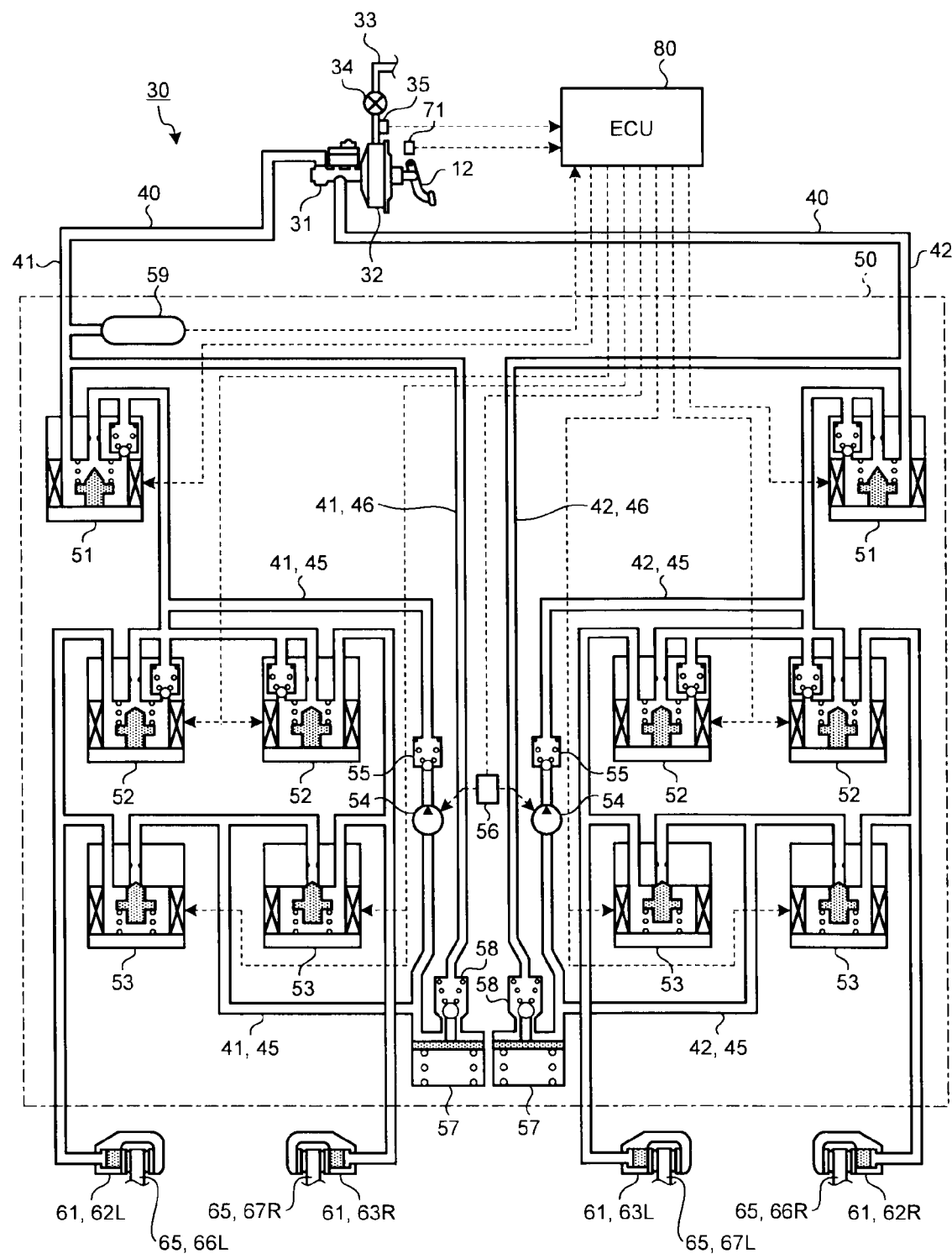
FIG. 2 is a schematic diagram illustrating a configuration of a brake device illustrated in FIG. 1.

FIG. 2 is a schematic diagram illustrating the configuration of the brake device illustrated in FIG. 1. The brake pedal 12 that is operated upon stopping the vehicle 1 (see FIG. 1) is connected to an intake path (not illustrated) of the engine to be connected to a brake booster 32 to which a negative pressure path 33 capable of transmitting negative pressure generated during the operation of the engine is connected. The negative pressure path 33 connected to the brake booster 32 is provided with a negative pressure path check valve 34 that serves as a check valve for cutting the flow of air toward the brake booster 32 from the intake path side, and a negative pressure sensor 35 that is a negative pressure detecting means capable of detecting the negative pressure in the negative pressure path 33.

The brake booster 32 is connected to the master cylinder 31 that can generate oil pressure, and the hydraulic path 40 is connected to the master cylinder 31. The hydraulic path 40 connected to the master cylinder 31 is filled with brake fluid (not illustrated) used as working fluid, wherein the brake device 30 can generate the braking force on the wheels 5 by changing the oil pressure of the brake fluid. The hydraulic path 40 is mounted as a dual system, wherein a first hydraulic path 41 and a second hydraulic path 42 constituting the dual system hydraulic path 40 are independently connected to the master cylinder 31.

The brake pedal 12 is connected to the hydraulic path 40 through the brake booster 32 and the master cylinder 31 as described above, wherein the brake booster 32 is a known vacuum servo unit, which can transmit the pedal effort input on the brake pedal 12 to the master cylinder 31 as increasing the same by utilizing the difference between the negative pressure transmitted from the negative pressure path 33 and the atmospheric pressure. The master cylinder 31 generates the oil pressure by the force transmitted from the brake booster 32, and can transmit the generated oil pressure to the hydraulic path 40.

The wheel cylinder 61 is connected to the end of the hydraulic path 40 connected to the master cylinder 31. The wheel cylinders 61 mounted in the vicinity of the wheels 5, which are located at the alternate position of the vehicle 1, are connected to the first hydraulic path 41 and the second hydraulic path 42. Specifically, the front-left wheel cylinder 62L and the rear-right wheel cylinder 63R are connected to the first hydraulic path 41, while the front-right wheel cylinder 62R and the rear-left wheel cylinder 63L are connected to the second hydraulic path 42.

Plural brake actuators 50 that can control the oil pressure in the hydraulic path 40 upon stopping the vehicle are mounted on the hydraulic path 40. Each of the brake actuators 50 includes a master cut valve 51 that is a normally-opened solenoid valve, a holding valve 52, and a pressure reducing valve 53 that is a normally-closed solenoid valve. The master cut valve 51, the holding valve 52, and the pressure reducing valve 53 are mounted as a braking force distribution control means capable of controlling the distribution of the braking force applied to the wheels 5. The one master cut valve 51 is provided to each of the first hydraulic path 41 and the second hydraulic path 42.

The holding valve 52 is mounted on the path from the master cylinder 31 toward the wheel cylinder 61 via the master cut valve 51 in the hydraulic path 40, wherein four holding valves 52 are mounted corresponding to four wheel cylinders 61.

The pressure reducing valve 53 is mounted on a return path 45 that is the path branched from the path from the holding valve 52 toward the wheel cylinder 61 and connected to the path between the master cut valve 51 and the holding valve 52. The return path 45 on which the pressure reducing valve 53 is mounted is branched from the paths between the four holding valves 52 and the wheel cylinders 61 respectively. The four pressure reducing valves 53 are mounted on the hydraulic path 40, since the pressure reducing valves 53 are provided on the respective branched paths. Specifically, four pressure reducing valves 53 are mounted so as to correspond to the four wheel cylinders 61, like the holding valves 52.

The portions of the two return paths 45 at the downstream side of the pressure reducing valve 53, i.e., the portions of the two return paths 45 connected to the path between the master cut valve 51 and the holding valve 52 from the pressure reducing valve 53, in the first hydraulic path 41 are connected to each other, and the same portions in the second hydraulic path 42 are connected to each other, to form one path respectively. A pressure pump 54 serving as the brake actuator 50 and a return path check valve 55 serving as a check valve mounted on the return path 45 are provided on the portion of one path in the return path 45. The return path check valve 55 is arranged at the side of the return path 45 connected to the path between the master cut valve 51 and the holding valve 52 from the pressure pump 54.

A drive motor 56 is connected to the pressure pump 54. When the pressure pump 54 is operated by the drive motor 56, it can feed the brake fluid in the return path 45 toward the master cut valve 51 or to the holding valve 52 from the pressure reducing valve 53. The return path check valve 55 flows only the brake fluid from the pressure pump 54 toward the master cut valve 51 or the holding valve 52, and cuts the flow of the brake fluid in the reverse direction. Since the pressure pump 54 and the return path check valve 55 are provided as described above, one pressure pump 54 and one return path check valve 55 are provided on each of the first hydraulic path 41 and the second hydraulic path 42, so that two pressure pumps 54 and two return path check valves 55 are provided in total.

A feed path 46, which is a path connected to the return path 45, is branched from the upstream side of the hydraulic path 40 with respect to the master cut valve 51, i.e., the portion of the hydraulic path 40 between the master cylinder 31 and the master cut valve 51. The feed path 46 is connected to the return path 45. A reservoir 57 and a feed path check valve 58 that is a check valve mounted on the feed path 46 are provided on the feed path 46. The feed path check valve 58 is arranged at the side of the feed path 46 connected to the path between the master cylinder 31 and the master cut valve 51 from the reservoir 57.

The reservoir 57 is provided so as to be capable of storing the brake fluid flowing through the feed path 46 in a predetermined amount, and the feed path check valve 58 flows only the brake fluid in the direction from the master cut valve 51 or the holding valve 52 toward the return path 45, while cuts the flow of the brake fluid in the reverse direction. Since the reservoir 57 and the feed path check valve 58 are provided as described above, one reservoir and one feed path check valve 58 are provided on each of the first hydraulic path 41 and the second hydraulic path 42, so that two reservoirs 57 and two feed path check valves 58 are provided in total.

A master cylinder pressure sensor 59 serving as an operation pressure detecting means is provided on the first hydraulic path 41 between the master cylinder 31 and the master cut valve 51. The master cylinder pressure sensor 59 is provided so as to be capable of detecting the oil pressure on the first hydraulic path 41 between the master cylinder 31 and the master cut valve 51 as an operation pressure, which is generated when a driver depresses the brake pedal 12 through the braking operation.

The negative pressure sensor 35, the master cylinder pressure sensor 59, the master cut valve 51, the holding valve 52, the pressure reducing valve 53, and the drive motor 56, thus provided, are connected to the ECU 80, and can be controlled by the ECU 80.

Figure 3:
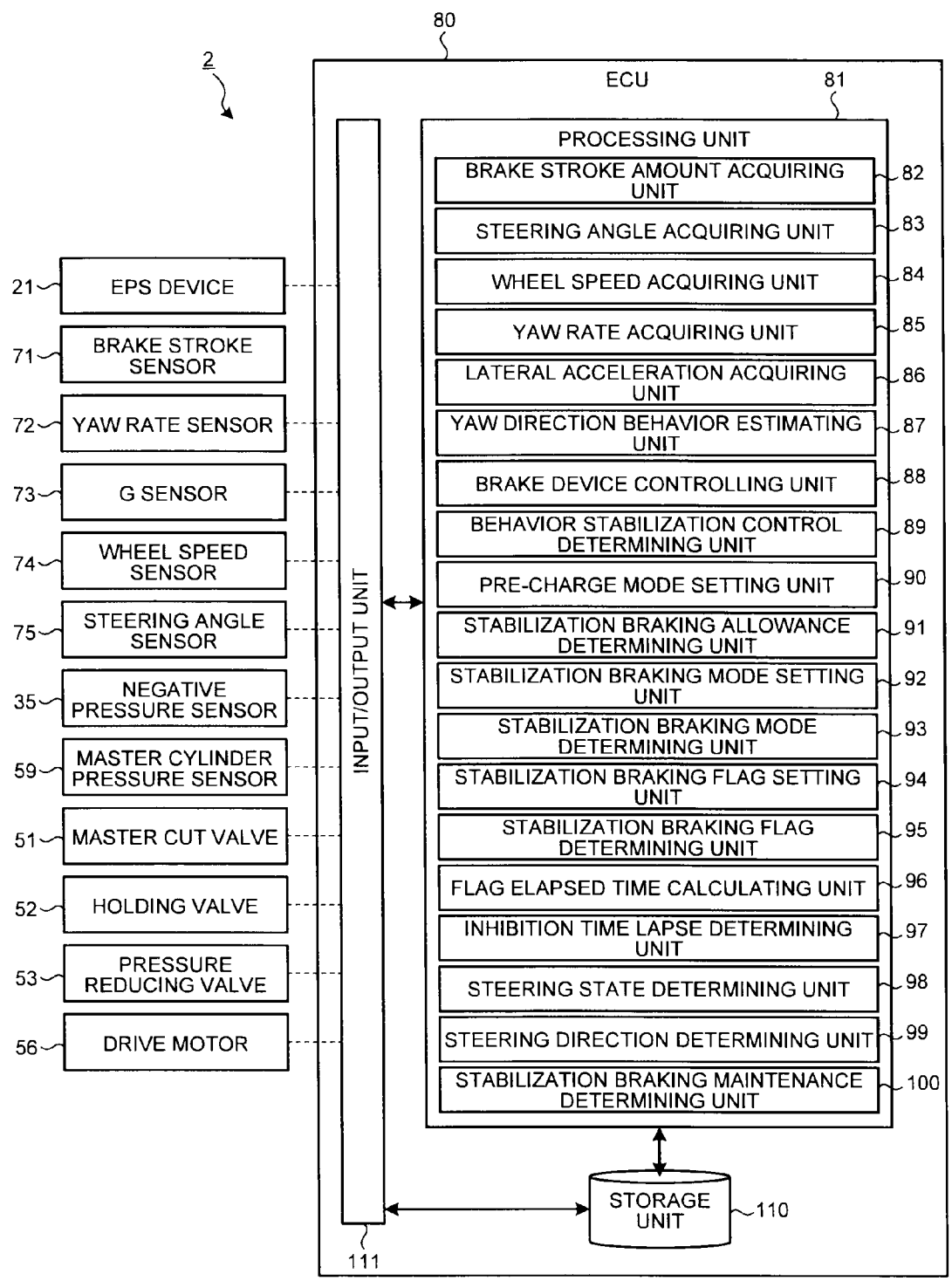
FIG. 3 is a diagram illustrating a configuration of an essential part of the vehicle behavior controlling apparatus illustrated in FIG. 1.

FIG. 3 is a diagram illustrating a configuration of an essential part of the vehicle behavior controlling apparatus illustrated in FIG. 1. The ECU 80 includes a processing unit 81, a storage unit 110, and an input/output unit 111. They are connected to one another, whereby they can receive and send signals with one another. The EPS device 21 connected to the ECU 80, the brake stroke sensor 71, the yaw rate sensor 72, the G sensor 73, the wheel speed sensor 74, the steering angle sensor 75, the negative pressure sensor 35, the master cylinder pressure sensor 59, the master cut valve 51, the holding valve 52, the pressure reducing valve 53, and the drive motor 56 are connected to the input/output unit 111, wherein the input/output unit 111 inputs and outputs signals to and from these sensors and the like.

The storage unit 110 stores a computer program that controls the vehicle behavior controlling apparatus 2 according to the first embodiment. The storage unit 110 can be composed of a hard disk device, a magneto optical disk device, a non-volatile memory (read-only storage medium such as CD-ROM) such as a flash memory, a volatile memory such as RAM (Random Access Memory), or a combination thereof.

The processing unit 81 is composed of a memory and a CPU (Central Processing Unit). It has a brake stroke amount acquiring unit 82 that is a braking operation acquiring means capable of acquiring a stroke amount of the brake pedal 12 from the detection result of the brake stroke sensor 71, a steering angle acquiring unit 83 that is a steering angle acquiring means capable of acquiring a steering angle that is a turning angle of the steering wheel 10 from the detection result of the steering angle sensor 75, a wheel speed acquiring unit 84 that is a wheel speed acquiring means capable of acquiring a wheel speed from the detection result of the wheel speed sensor 74, a yaw rate acquiring unit 85 that is a yaw rate acquiring means capable of acquiring a yaw rate during the travel of the vehicle 1 from the detection result of the yaw rate sensor 72, and a lateral acceleration acquiring unit 86 that is a lateral acceleration acquiring means capable of acquiring lateral acceleration during the travel of the vehicle 1 from the detection result of the G sensor 73.

The processing unit 81 also includes a yaw direction behavior estimating unit 87 that is a yaw direction behavior estimating means estimating the behavior of the vehicle 1 in the yaw direction, a brake device controlling unit 88 that is a control means of a brake means capable of controlling the braking force generated on the wheels 5 by controlling of the oil pressure of the brake fluid through the control of the brake device 30, and a behavior stabilization control determining unit 89 that is a behavior stabilization control determining means determining whether the behavior stabilization control is executed or not based upon the driving condition of the vehicle 1.

The processing unit 81 also includes a pre-charge mode setting unit 90, on the front wheel 6 that is reverse to the steering direction during the turning of the vehicle 1, serving as a pre-charge mode setting means that sets an execution mode of a pre-charge, which is a preliminary braking for generating weak braking force to a degree not affecting the deceleration of the whole vehicle 1, a stabilization braking allowance determining unit 91 serving as a stabilization braking allowance determining means that determines whether the stabilization braking for generating a predetermined braking force on the front wheel 6 that is reverse to the steering direction in the second steering during the turning-back steering is allowed or not, a stabilization braking mode setting unit 92 serving as a stabilization braking mode setting means that sets the execution mode of the stabilization braking, and a stabilization braking mode determining unit 93 serving as a stabilization braking mode determining means that determines the condition of the stabilization braking mode.

The processing unit 81 also includes a stabilization braking flag setting unit 94 serving as a stabilization braking flag setting means that sets a stabilization braking once-execution flag, which is a flag indicating that the stabilization braking is performed once, according to the condition of the execution of the stabilization braking, a stabilization braking flag determining unit 95 serving as a stabilization braking flag determining means that determines the state of the stabilization braking once-execution flag, a flag elapsed time calculating unit 96 serving as a flag elapsed time calculating means that calculates the elapsed time in the predetermined state of the stabilization braking once-execution flag, and an inhibition time lapse determining unit 97 serving as an inhibition time lapse determining means that determines whether the elapsed time calculated by the flag elapsed time calculating unit 96 is longer than the inhibition time of the stabilization braking or not.

The processing unit 81 also includes a steering state determining unit 98 serving as a steering state determining means that determines the steering state based upon the steering angle acquired by the steering angle acquiring unit 83, a steering direction determining unit 99 serving as a steering direction determining means that determines the steering direction based upon the steering angle acquired by the steering angle acquiring unit 83, and a stabilization braking maintenance determining unit 100 serving as a stabilization braking maintenance determining means that determines whether it is the state in which the stabilization braking is maintained or not based upon the steering state determined by the steering state determining unit 98.

The ECU 80 controls the master cut valve 51 in such a manner that, for example, the processing unit 81 reads and calculates the computer program into the memory incorporated in the processing unit 81 based upon the detection result of the yaw rate sensor 72 so as to operate the master cut valve 51 based upon the result of the calculation. In this case, the processing unit 81 appropriately stores the numerical value, which is currently calculated, into the storage unit 110, or takes the stored numerical value to execute the calculation. When the master cut valve 51 is controlled as described above, a dedicated hardware different from the ECU 80 may be used instead of the computer program.

The vehicle behavior controlling apparatus 2 according to the first embodiment is configured as described above, and its operation will next be described below. The vehicle 1 travels by operating the engine serving as the power source. When the vehicle 1 travels, the wheel speed sensor 74 detects the wheel speed that is the rotation speed of the wheel 5. The wheel speed detected by the wheel speed sensor 74 is transmitted to the wheel speed acquiring unit 84 of the processing unit 81 in the ECU 80 so as to be acquired by the wheel speed acquiring unit 84. When the wheel speed is acquired by the wheel speed acquiring unit 84, the detection results of four wheel speed sensors 74 are independently acquired. Specifically, the wheel speed acquiring unit 84 independently acquires the wheel speeds of four wheels 5.

When the vehicle 1 is decelerated during the travel, the driver depresses the brake pedal 12 to apply the braking force on the vehicle 1. When the braking operation is executed by the depression of the brake pedal 12 as described above, the pedal effort is transmitted to the brake booster 32. The negative pressure path 33 is connected to the brake booster 32, and the negative pressure generated during the intake stroke upon the operation of the engine can be transmitted to the brake booster 32 through the negative pressure path 33. Therefore, when the pedal effort is input to the brake booster 32, the brake booster 32 increases the pedal effort by the difference between the negative pressure and the atmospheric pressure, and inputs the resultant to the master cylinder 31. The master cylinder 31 to which the force increased with respect to the pedal effort is input applies pressure to the brake fluid according to the input force, thereby increasing the master cylinder oil pressure that is the oil pressure in the brake fluid in the master cylinder 31.

When the master cylinder oil pressure increases, the pressure of the brake fluid in the hydraulic path 40 connected to the master cylinder 31 also increases, whereby the oil pressure in the hydraulic path 40 becomes the same as the master cylinder oil pressure. Further, when the oil pressure in the hydraulic path 40 increases as described above, this oil pressure is also transmitted to the wheel cylinder 61 via the master cut valve 51, which is the normally-opened solenoid valve, and the holding valve 52. In this case, since the pressure reducing valve 53 is normally closed, the brake fluid in the hydraulic path 40 does not flow in the return path 45 from the holding valve 52 through the pressure reducing valve 53. Therefore, the oil pressure flowing from the holding valve 52 to the wheel cylinder 61 is not reduced.

When the increased oil pressure is transmitted to the wheel cylinder 61 as described above, the wheel cylinder 61 is operated by the transmitted oil pressure. Specifically, the wheel cylinder 61 is operated by the master cylinder oil pressure. When the wheel cylinder 61 is operated, the wheel cylinder 61 reduces the rotation speed of the brake disk 65, which is mounted as a set of the wheel cylinder 61 and rotates integral with the wheel 5 during the turn of the wheel 5. Thus, the rotation speed of the wheel 5 also reduces, whereby the wheel 5 generates the braking force to the road surface, resulting in that the vehicle 1 decelerates.

As described above, when the brake pedal 12 is operated, the brake force, which is the force for reducing the rotation speed of the brake disk 65, is applied to the wheel cylinder 61. Therefore, the rotation speed of the wheel 5 can be reduced through the reduction in the rotation speed of the brake disk 65, whereby the running vehicle 1 can be stopped.

When the brake pedal 12 is operated as described above, the stroke amount of the brake pedal 12 is detected by the brake stroke sensor 71 mounted in the vicinity of the brake pedal 12. The detection result of the brake stroke sensor 71 is acquired by the brake stroke amount acquiring unit 82 of the processing unit 81 in the ECU 80. The brake device controlling unit 88 of the processing unit 81 in the ECU 80 controls the brake actuator 50 according to the stroke amount of the brake pedal 12 acquired by the brake stroke amount acquiring unit 82 and the detection results of the other sensors mounted on the vehicle 1, thereby controlling the oil pressure exerted on the wheel cylinder 61.

When the advancing direction of the vehicle 1 is changed by turning the vehicle 1, the steering wheel 10 is turned with the steering shaft 22 defined as a rotation shaft to operate the steering wheel. When the steering shaft 22 is rotated by turning the steering wheel 10, the rotation is transmitted to the EPS device 21. The EPS device 21 operates according to the rotation of the steering shaft 22, thereby outputting pressing force or tensile force to the tie rod 25. The force applied from the EPS device 21 to the tie rod 25 is transmitted to the knuckle arm 26, whereby the knuckle arm 26 swings by this force. Thus, the front wheel 6 also turns, and the turning direction of the front wheel 6 is different from the front-to-rear direction of the vehicle 1, whereby the advancing direction of the vehicle 1 changes to make a turn.

The vehicle 1 turns through the operation of the steering wheel 10 as described above. The steering angle changed by the operation of the steering wheel 10 is detected by the steering angle sensor 75 mounted to the EPS device 21. The steering angle detected by the steering angle sensor 75 is transmitted to the steering angle acquiring unit 83 of the processing unit 81 in the ECU 80 so as to be acquired by the steering angle acquiring unit 83.

When the vehicle 1 turns, a yaw moment, which is a rotation force about the vertical shaft of the vehicle 1, is generated on the vehicle 1. When the yaw moment is generated on the vehicle 1 as described above, the yaw rate sensor 72 detects the yaw angle rate, which is the yaw angle rate in case where the yaw moment is generated and the vehicle 1 turns about the vertical shaft. The yaw rate detected by the yaw rate sensor 72 is transmitted to the yaw rate acquiring unit 85 of the processing unit 81 in the ECU 80 so as to be acquired by the yaw rate acquiring unit 85.

When the vehicle 1 turns, centrifugal force is generated on the vehicle 1. Therefore, the acceleration in the widthwise direction of the vehicle 1, i.e., the lateral acceleration that is the acceleration in the lateral direction, is generated due to the centrifugal force. The lateral acceleration generated during the turn of the vehicle 1 is detected by the G sensor 73, and the detection result is acquired by the lateral acceleration acquiring unit 86 of the processing unit 81 in the ECU 80.

The wheel speed, the yaw rate, and the lateral acceleration acquired during the turn of the vehicle 1 are transmitted to the yaw direction behavior estimating unit 87 of the processing unit 81 in the ECU 80 so as to estimate the behavior in the yaw direction by the yaw direction behavior estimating unit 87. The behavior in the yaw direction estimated by the yaw direction behavior estimating unit 87 is transmitted to the behavior stabilization control determining unit 89 with the steering angle of the steering wheel 10 acquired during the turn of the vehicle 1, whereby the behavior stabilization control determining unit 89 determines whether the behavior stabilization control is performed or not based upon these factors. When the behavior stabilization control determining unit 89 determines that the behavior stabilization control is performed, the brake device controlling unit 88 causes a difference in the braking force between the left and right wheels 5, thereby generating the yaw moment in the direction reverse to the direction of the yaw moment that is currently generated so as to reduce the yaw moment currently generated. Thus, the behavior stabilization control is executed.

Specifically, when the behavior stabilization control is executed, the brake device controlling unit 88 appropriately operates the drive motor 56, the master cut valve 51, the holding valve 52, and the pressure reducing valve 53 for controlling the braking forces of the left and right wheels 5, i.e., the front-left wheel 6L and the front-right wheel 6R, and the rear-left wheel 7L and the rear-right wheel 7R, thereby causing the difference in the braking force between left and right wheels 5. Specifically, when the braking force is generated on the front wheel 6 at the side reverse to the turning direction, i.e., the front wheel 6 at the outside during the turn, the yaw moment in the direction reverse to the yaw moment generated by the normal turn is generated on the vehicle 1.

Therefore, during the behavior stabilization control, the braking force is generated on the front wheel 6 at the outside during the turn. Thus, the yaw moment in the direction reverse to the currently-generated yaw moment is generated, whereby the behavior in the yaw direction is stabilized.

For example, when the behavior stabilization control is executed with the driver not performing the brake operation, the drive motor 56 is operated to operate the pressure pump 54, and with this state, the degree of the opening of the master cut valve 51 is adjusted to adjust the amount of the brake fluid flowing from the return path 45 toward the holding valve 52, whereby the oil pressure of the brake fluid in the hydraulic path 40 is controlled. When the pressure reducing valve 53 that corresponds to the wheel 5 on which the braking force is not generated is opened, the oil pressure is not applied to the wheel cylinder 61 corresponding to this wheel 5, whereby the oil pressure increased by the pressure pump 54 is applied only to the wheel cylinder 61 corresponding to the wheel 5 on which the braking force is generated. Specifically, when the braking force is generated only on the front wheel 6 at the outside of the turn during the behavior stabilization control, the pressure pump 54 is operated, and the pressure reducing valves 53 corresponding to the wheels 5 other than the wheel 5 on which the braking force is generated are opened, whereby the oil pressure is applied only to the wheel cylinder 61 corresponding to the front wheel 6 at the outside during the turn so as to generate the braking force only on this wheel 5. Thus, the yaw moment reverse to the currently-generated yaw moment on the vehicle 1 is generated, whereby the behavior in the yaw direction generated on the vehicle 1 is reduced.

Specifically, when the behavior stabilization control is performed, the difference is caused between the oil pressure causing braking force on the left wheels 5 of the left and right wheels 5 and the oil pressure causing braking force on the right wheels 5, whereby the braking forces generated on the left and right wheels 5 are different from each other, resulting in that the behavior in the yaw direction is reduced. When the behavior stabilization control is performed, it is preferable that the difference in the braking forces between the left and right front wheels 6 that are the steered wheels, i.e., the difference in the braking forces between the front-left wheel 6L and the front-right wheel 6R, is controlled, so as to reduce the behavior in the yaw direction of the vehicle 1.

When the behavior stabilization control determining unit 89 determines that the behavior stabilization control is performed during the turn of the vehicle 1, the behavior stabilization control is performed as described above. When the steering wheel 10 is steered in one direction, and then, steered in the reverse direction, i.e., when the turning-back steering is executed, the stabilization braking, which is a control for generating the braking force on the front wheel 6 at the outside during the turn by the second steering, is executed, when the steering angle is maintained to be the one in the second steering. Specifically, in the stabilization braking, predetermined braking force is generated to the front wheel 6 at the side reverse to the steering direction in the second steering when the turning-back steering is executed, and further, the amount of the reduction in the braking force is limited, when the steering angle in the second steering is maintained. Thus, when the steering angle in the second steering is maintained during the turning-back steering, the predetermined braking force according to the condition of the vehicle 1 or the steering condition is continuously generated on the front wheel 6 at the outside during the turn by the second steering.

Figure 4:
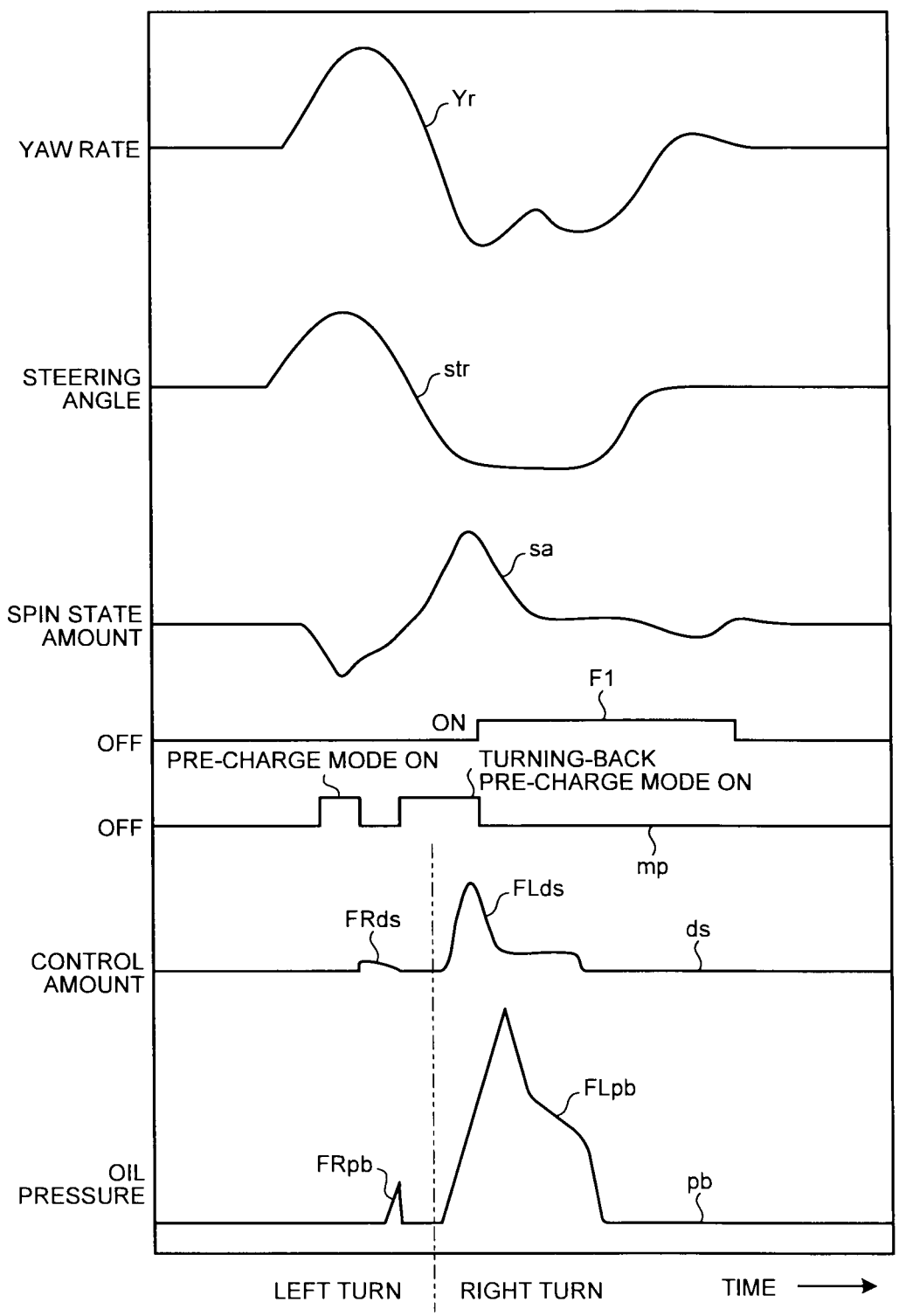
FIG. 4 is an explanatory view illustrating a relationship between respective operation amounts upon performing a turning-back steering.

FIG. 4 is an explanatory view illustrating the relationship among the respective operation amounts when the turning-back steering is executed. When the turning-back steering is executed, the stabilization braking is performed as described above. The respective operation amounts during the turning-back steering will be described. When the driver operates the steering wheel, so that the steering angle str in one direction increases, the vehicle 1 turns. Accordingly, the yaw rate Yr increases. When the yaw rate Yr increases with respect to the steering angle str in case where the vehicle 1 is turning as described above, the behavior of the vehicle 1 becomes unstable, so that a spin is easy to occur. A spin state amount sa that is an amount of a state indicating that the spin is easy to occur tends to increase when the steering angle str increases. When the spin state amount sa increases, the vehicle 1 might spin. Therefore, in the driving state in which the spin state amount sa increases, the pre-charge mode setting unit 90 of the processing unit 81 in the ECU 80 turns ON a braking force generating mode mp that indicates the control state of the braking force.

When the pre-charge mode, which indicates whether the pre-charge that is the control for generating a weak braking force on the front wheel 6 located at the outside of the turn during the turn is executed or not is turned ON by turning ON the braking force generating mode mp as described above, a control amount ds for executing the pre-charge is calculated based upon the yaw rate Yr and the like as a control amount ds capable of reducing the spin state amount sa. The brake device controlling unit 88 controls the brake device 30 based upon the control amount ds, whereby an oil pressure pb according to the control amount ds is applied to the wheel cylinder 61 corresponding to the front wheel 6 at the outside of the turn. For example, in the case of the left turn, the front wheel 6 at the outside of the turn is the front-right wheel 6R. Therefore, a front-right wheel control amount FRds, which is a control amount generated on the front-right wheel 6R, is calculated based upon the yaw rate Yr and the like, whereby a front-right wheel oil pressure FRpb that is the oil pressure pb according to the front-right wheel control amount FRds is applied to the front-right wheel cylinder 62R. Thus, weak braking force is generated on the front-right wheel 6R during the left turn. The pre-charge executed as described above ends in a short period, regardless of the steering state.

When the driver turns the steering wheel 10 in the direction reverse to the turning direction so far to perform the so-called turning-back steering, the steering angle str becomes the steering angle str at the side opposite to the side where the steering angle str so far is located about a neutral position, which is defined as the position where the steering angle str during when the vehicle 1 goes straight is located. In this case, the behavior of the vehicle 1 changes according to the turning-back steering, and the vehicle 1 turns in the direction reverse to the turning direction before the turning-back steering is executed. Therefore, the yaw rate Yr in the direction reverse to the direction of the yaw rate Yr before the turning-back steering is executed is generated.

When the turning-back steering is executed, the yaw rate Yr tends to increase. Therefore, the spin state amount sa by the second steering in the turning-back steering tends to increase more than the spin state amount sa by the first steering. Accordingly, the stabilization braking that is the braking control executed to the second steering in the turning-back steering is started at the point when the turning-back steering is determined to be executed, even before the steering angle str is completely changed to the position in the direction reverse to the steering angle str in the first steering.

Accordingly, when it is determined that the turning-back steering is executed, the stabilization braking mode setting unit 92 of the processing unit 81 in the ECU 80 turns ON the braking force generating mode mp, thereby turning ON the stabilization braking mode, which indicates whether the stabilization braking that is the control for generating the braking force on the front wheel 6 located at the outside of the turn is executed or not during the turn by the second steering in the turning-back steering.

When the stabilization braking mode is turned ON by turning ON the braking force generating mode mp, the control amount ds upon executing the stabilization braking is calculated based upon the yaw rate Yr and the like as the control amount ds capable of reducing the spin state amount sa. The brake device controlling unit 88 controls the brake device 30 based upon the control amount ds, whereby the oil pressure pb according to the control amount ds is applied to the wheel cylinder 61 corresponding to the front wheel 6 at the outside of the turn. In this case, the control amount ds increases more than the control amount ds upon performing the pre-charge, and with this, the oil pressure pb applied to the wheel cylinder 61 becomes greater than the oil pressure pb upon performing the pre-charge. For example, when the turning-back steering from the left turn to the right turn is executed, the front wheel 6 at the outside of the turn becomes the front-left wheel 6L. Therefore, a front-left wheel control amount FLds, which is a control amount for generating on the front-left wheel 6L, is calculated based upon the yaw rate Yr and the like, whereby a front-left wheel oil pressure FLpb, which is the oil pressure pb according to the front-left wheel control amount FLds, is applied to the front-left wheel cylinder 62L. When the stabilization braking is performed as described above, the front-left wheel control amount FLds becomes greater than the front-right wheel control amount FRds that is the control amount ds for performing the pre-charge, and with this, the front-left wheel oil pressure FLpb that is the oil pressure pb applied to the front-left wheel cylinder 62L also becomes greater than the front-right wheel oil pressure FRpb that is the oil pressure pb upon performing the pre-charge. When the turning-back steering from the left turn to the right turn is executed as described above, the front-left wheel oil pressure FLpb is applied to the front-left wheel cylinder 62L, whereby the braking force is generated on the front-left wheel 6L that is the front wheel 6 located at the outside of the turn by the second steering.

When the stabilization braking is performed by controlling the brake device 30 as described above, the stabilization braking once-execution flag F1, which is a flag indicating that the stabilization braking is executed once, is turned ON.

The pre-charge is ended in a short period. On the other hand, when the steering angle in the second steering during the turning-back steering is maintained, the stabilization braking is continued. Therefore, the control amount ds of the stabilization braking maintains the front-left wheel control amount FLds, during when the steering angle str in the right turn, which is the second steering in the case of the turning-back steering from the left turn to the right turn, is maintained. With this, the front-left wheel oil pressure FLpb applied to the front-left wheel cylinder 62L corresponding to the front-left wheel 6L, on which the braking force is generated upon performing the stabilization braking, is maintained to be the oil pressure pb that can generate the braking force with the front-left wheel 6L. Specifically, even if the behavior of the vehicle 1 is stabilized because the steering angle str is maintained during the turning-back steering, so that the spin state amount sa is reduced, the stabilization braking is continued during when the steering angle str is maintained.

Since the stabilization braking is continued during when the steering angle str is maintained, even when the spin state amount sa is reduced as described above, the weak yaw moment in the direction reverse to the direction of the yaw moment that is currently generated is generated on the vehicle 1. By virtue of this, the yaw moment generated by the turning-back steering is difficult to be increased, even in the state in which the steering angle str is maintained and the yaw moment is continuously generated. Therefore, the spin state amount sa is also difficult to be increased. Accordingly, the vehicle 1 is difficult to become unstable, whereby the occurrence of the spin is prevented.

The stabilization braking that is continued during when the steering angle str is maintained as described above is ended when the steering angle str is returned in the direction of the neutral position. When the stabilization braking is ended, the control amount ds of the stabilization braking becomes 0, whereby the oil pressure applied to the wheel cylinder 61 also becomes 0.

When the steering angle str is returned to the vicinity of the neutral position, the yaw rate Yr also becomes nearly 0. The stabilization braking once-execution flag F1 is turned OFF after a predetermined period, which is the period of inhibiting the stabilization braking, has elapsed after the start of the stabilization braking.

Figures 1, 5:
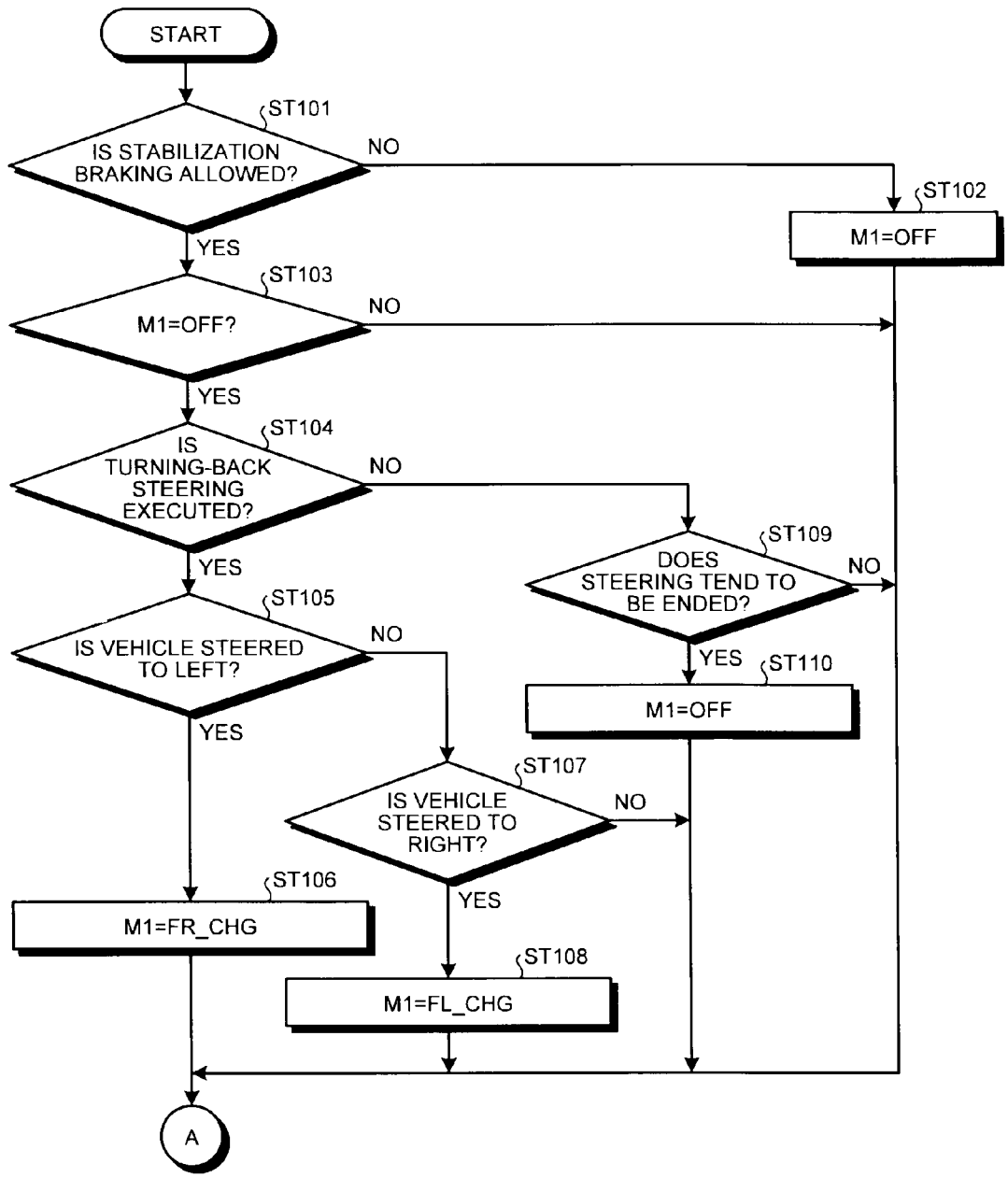
Figures 2, 5:
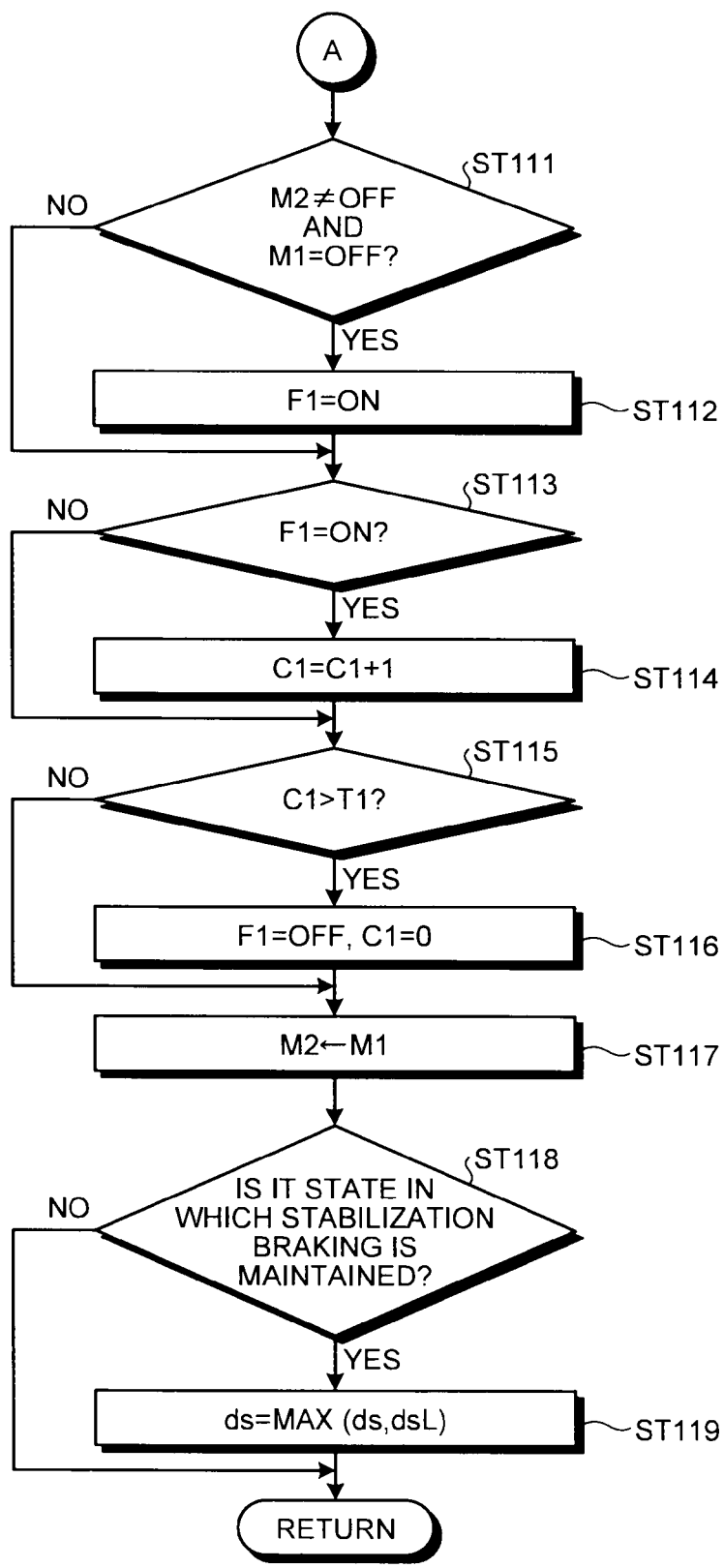

FIGS. 5-1 and 5-2 are flowcharts illustrating the procedure of the vehicle behavior controlling apparatus according to the first embodiment. The control method of the vehicle behavior controlling apparatus 2 according to the first embodiment, i.e., the procedure of the vehicle behavior controlling apparatus 2, will next be described. The process described below is called and executed every predetermined period, in order to control the respective units when the vehicle 1 is driven. In the procedure of the vehicle behavior controlling apparatus 2 according to the first embodiment, it is firstly determined whether the stabilization braking is allowed or not (step ST101). This determination is made by the stabilization braking allowance determining unit 91 of the processing unit 81 in the ECU 80 based upon the driving condition of the vehicle 1. When the stabilization braking allowance determining unit 91 determines whether the stabilization braking is allowed or not, the determination for allowing the stabilization braking is made in case where the vehicle is in the non-braking state, the state-amount calculation for the behavior stabilization control is in the allowed state, and an ABS (Antilock Brake device) is normal, for example.

The determination as to whether the vehicle 1 is in the non-braked state or not is made such that, when the stroke amount of the brake pedal 12 acquired by the brake stroke amount acquiring unit 82 is 0, the brake operation is not performed, so that the vehicle 1 is in the non-braked state. The determination as to whether the state-amount calculation of the behavior stabilization control is in the allowed state or not is made based upon whether the sensors, such as the yaw rate sensor 72 or the steering angle sensor 75, used in the behavior stabilization control are normally operated or not. When these sensors are not normally operated, the state amount of the vehicle stabilization control cannot correctly be calculated, so that the state-amount calculation of the behavior stabilization control cannot be allowed. Specifically, when these sensors are normally operated, it is determined that the state-amount calculation of the behavior stabilization control is allowed. The determination as to whether the ABS is normal or not is made based upon whether the brake actuator 50 in the brake device 30 is normally operated or not. When the brake actuator 50 is normally operated, it is determined that the ABS is normal.

The stabilization braking allowance determining unit 91 makes the respective determinations as described above. When any one of the determinations does not allow the stabilization braking, i.e., when the vehicle 1 is in the braked state, when the state-amount calculation of the behavior stabilization control is not in the allowed state, and when the ABS is not normal, the determination for not allowing the stabilization braking is made.

When the determination for not allowing the stabilization braking is made by the determination (step ST101) at the stabilization braking allowance determining unit 91, the stabilization braking mode M1 indicating the state of the stabilization braking is set to be OFF (step ST102). The stabilization braking mode M1 is stored in the storage unit 110 in the ECU 80, wherein it is set by the stabilization braking mode setting unit 92 of the processing unit 81 in the ECU 80. The stabilization braking mode setting unit 92 sets the stabilization braking mode M1, which is stored in the storage unit 110, to be OFF as described above. After the stabilization braking mode M1 is set to be OFF at the stabilization braking mode setting unit 92, the procedure proceeds to a later-described step ST111.

On the other hand, when it is determined that the stabilization braking is allowed by the determination at the stabilization braking allowance determining unit 91 (step ST101), it is next determined whether the stabilization braking mode M1 is OFF or not (step ST103). The stabilization braking mode determining unit 93 of the processing unit 81 in the ECU 80 makes this determination. The stabilization braking mode determining unit 93 determines whether the stabilization braking mode M1 stored in the storage unit 110 in the ECU 80 is turned OFF or not. When it is determined that the stabilization braking mode M1 is not OFF by the determination at the stabilization braking mode determining unit 93, the procedure proceeds to the later-described step ST111.

When it is determined that the stabilization braking mode M1 is OFF by the determination at the stabilization braking mode determining unit 93 (step ST103), it is next determined whether the turning-back steering is executed or not (step ST104). The steering state determining unit 98 of the processing unit 81 in the ECU 80 makes this determination.

When it is determined whether the turning-back steering is executed or not, the steering state determining unit 98 compares gyNorm, which is the value obtained by multiplying the sign of the yaw rate Yr acquired by the yaw rate acquiring unit 85 and the lateral acceleration gy acquired at the lateral acceleration acquiring unit 86, and Thgy that is the threshold value of the lateral acceleration gy, so as to determine whether an inequality of gyNorm>Thgy is established or not. In the calculation below, the sign during the left turn is positive, while the sign during the right turn is negative. Therefore, the sign of the yaw rate Yr used for calculating the gyNorm becomes such that the sign during the left turn is positive, while the sign during the right turn is negative. Similarly, the sign of the lateral acceleration gy generated during the left turn is positive, while the sign of the lateral acceleration during the right turn is negative.

Therefore, since the sign of the yaw rate Yr and the sign of the lateral acceleration gy are the same during the normal turn of the vehicle 1, the sign of the value obtained by multiplying these values generally becomes positive. Accordingly, the case in which the sign of the gyNorm, which is obtained by multiplying the sign of the yaw rate Yr and the lateral acceleration gy, is positive, indicates that the behavior in the yaw direction and the turning direction are the same. The case in which the sign of the gyNorm is negative indicates that the behavior in the yaw direction and the turning direction are different from each other. Specifically, when the inequality of gyNorm>Thgy is satisfied, the turning direction indicated by the yaw rate Yr and the turning direction indicated by the lateral acceleration gy are the same, which means that the behavior of the vehicle 1 in the yaw direction is the same as the turning direction.

The steering state determining unit 98 compares strSpeedNorm, which is the value obtained by multiplying the sign of the yaw rate Yr and a steering angle speed strSpeed acquired at the steering angle acquiring unit 83, and Thstrsp1 that is the threshold value of the steering angle speed strSpeed, so as to determine whether an inequality of strSpeedNorm<Thstrsp1 is established or not. Specifically, the case in which the sign of the strSpeedNorm, which is the value obtained by multiplying the sign of the yaw rate Yr and the steering angle speed strSpeed, is positive indicates that the vehicle 1 normally turns. The case in which the sign of the strSpeedNorm is negative indicates that the direction of the behavior in the yaw direction and the steering direction are different from each other. Specifically, when the inequality of strSpeedNorm<Thstrsp1 is satisfied, the vehicle 1 is steered in the direction reverse to the turning direction indicated by the yaw rate Yr.

The steering state determining unit 98 compares yAccNorm, which is the value obtained by multiplying the sign of the yaw rate Yr and a yaw acceleration yAcc acquired by the yaw rate acquiring unit 85, and Thyacc1 that is the threshold value of the yaw acceleration yAcc in order to determine whether an inequality of yAccNorm<Thyacc1 is established or not. Specifically, the case in which the sign of the yAccNorm, which is the value obtained by multiplying the sign of the yaw rate Yr and the yaw acceleration yAcc, is positive indicates that the rate of change in the yaw rate Yr increases, which means that the vehicle 1 normally turns. The case in which the sign of the yaw rate Yr is negative indicates that the rate of change in the yaw rate Yr decreases. Specifically, when the inequality of yAccNorm<Thyacc1 is satisfied, the yaw rate Yr starts to decrease.

Accordingly, when the inequalities of gyNorm >Thgy, strSpeedNorm<Thstrsp1, and yAccNorm<Thyacc1 are all satisfied, the behavior of the vehicle 1 in the yaw direction is the same as the turning direction, the vehicle 1 is steered in the direction reverse to the turning direction indicated by the yaw rate Yr, and the yaw rate Yr starts to decrease. Therefore, this indicates that the turning-back steering in the reverse direction during the turn in one direction is performed. Accordingly, in this case, the steering state determining unit 98 determines that the driver makes the turning-back steering. The threshold value Thgy of the lateral acceleration, the threshold value Thstrsp1 of the steering angle speed, and the threshold value Thyacc1 of the yaw angle rate, which are used for the determination, are set beforehand and stored in the storage unit 110 in the ECU 80.

When it is determined that the turning-back steering is executed because the inequalities of gyNorm >Thgy, strSpeedNorm<Thstrsp1, and yAccNorm<Thyacc1 are all satisfied according to the determination (step ST104) at the steering state determining unit 98, it is next determined whether the vehicle 1 is steered to the left or not (step ST105). This determination is made by the steering direction determining unit 99 of the processing unit 81 in the ECU 80. Since the sign at the left turn is positive, while the sign at the right turn is negative in the calculation in the vehicle behavior controlling apparatus 2 according to the first embodiment, the steering direction determining unit 99 determines whether the vehicle 1 is steered to the left or not by determining whether the steering angle speed strSpeed acquired by the steering angle acquiring unit 83 is greater than 0 or not. Specifically, the steering direction determining unit 99 determines that the vehicle 1 is steered to the left when the inequality of the steering angle speed strSpeed>0 is established.

When it is determined that the vehicle 1 is steered to the left according to the determination (step ST105) at the steering direction determining unit 99, the stabilization braking mode M1 is set to be FR CHG by the stabilization braking mode setting unit 92 (step ST106). Specifically, the stabilization braking mode M1 is set to be FR_CHG, which is the mode for performing the stabilization braking to the second hydraulic path 42, of the hydraulic path 40, that is the system to which the front-right wheel cylinder 62R is connected.

On the other hand, when it is determined that the vehicle 1 is not steered to the left according to the determination (step ST105) at the steering direction determining unit 99, i.e., when it is determined that the inequality of the steering angle speed strSpeed>0 is not established, it is then determined whether the vehicle 1 is steered to the right or not (step ST107). This determination is made by the steering direction determining unit 99. On the contrary to the determination as to whether the vehicle 1 is steered to the left, whether the steering angle speed strSpeed acquired by the steering angle acquiring unit 83 is smaller than 0 or not is determined in order to determine whether the vehicle 1 is steered to the right or not. Specifically, when the inequality of the steering angle speed strSpeed<0 is established, the steering direction determining unit 99 determines that the vehicle 1 is steered to the right. When it is determined that the vehicle 1 is not steered to the right by this determination, which means it is determined that the vehicle 1 is steered neither to the left nor to the right, the procedure proceeds to the later-described step ST111.

When it is determined that the vehicle 1 is steered to the right by the determination (step ST107) at the steering direction determining unit 99, the stabilization braking mode M1 is set to be FL_CHG by the stabilization braking mode setting unit 92 (step ST108). Specifically, the stabilization braking mode M1 is set to be FL_CHG, which is the mode for performing the stabilization braking to the first hydraulic path 41, of the hydraulic path 40, which is the system to which the front-left wheel cylinder 62L is connected.

When it is determined that the turning-back steering is not executed because any one of inequalities of gyNorm>Thgy, strSpeedNorm<Thstrsp1, and yAccNorm<Thyacc1 is not satisfied according to the determination (step ST104) at the steering state determining unit 98, it is then determined whether the steering tends to be ended or not (step ST109). This determination is made by the steering state determining unit 98.

When it is determined whether the steering tends to be ended or not, the steering state determining unit 98 compares abs(str), which is an absolute value of the steering angle str acquired by the steering angle acquiring unit 83, and Thstr that is the threshold value of the steering angle so as to determine whether an inequality of abs(str)<Thstr is established or not. The case in which the inequality of abs(str)<Thstr is satisfied indicates that the current steering angle is smaller than a predetermined value.

The steering state determining unit 98 compares abs(strSpeed), which is an absolute value of the steering angle speed strSpeed acquired by the steering angle acquiring unit 83, and Thstrsp2 that is a threshold value of the steering angle speed so as to determine whether an inequality of abs(strSpeed)<Thstrsp2 is satisfied or not. The case in which the inequality of abs(strSpeed)<Thstrsp2 is satisfied indicates that the current steering angle speed is smaller than a predetermined value.

The steering state determining unit 98 also compares abs(yAcc), which is an absolute value of the yaw acceleration yAcc acquired by the yaw rate acquiring unit 85, and Thyacc2 that is a threshold value of the steering angle speed so as to determine whether an inequality of abs(yAcc)<Thyacc2 is established or not. The case in which the abs(yAcc)<Thyacc2 is satisfied indicates that the current yaw acceleration is smaller than a predetermined value.

Accordingly, when abs(str)<Thstr is satisfied, and abs(str-Speed)<Thstrsp2, or abs(yAcc)<Thyacc2 is satisfied, the steering angle is reduced, and the steering angle speed or the yaw angle rate is reduced. Therefore, the steering state determining unit 98 determines that the steering is ended, or that the steering is about to end, which means the steering tends to be ended. The Thstr that is the threshold value of the steering angle, Thstrsp2 that is the threshold value of the steering angle speed, and Thyacc2 that is the threshold value of the yaw angle rate, which are used for the determination, are set beforehand and stored in the storage unit 110 in the ECU 80. When it is determined by the determination at the steering state determining unit 98 that the steering does not tend to be ended, the procedure proceeds to the later-described step ST111.

When it is determined that the steering tends to be ended by the determination (step ST109) at the steering state determining unit 98, the stabilization braking mode setting unit 92 sets the stabilization braking mode M1 to be OFF (step ST110).

When the stabilization braking mode setting unit 92 sets the stabilization braking mode M1 to be OFF (steps ST102, ST110), to be FR_CHG (step ST106), or to be FL_CHG (step ST108), or when it is determined that the stabilization braking mode M1 is not OFF by the determination at the stabilization braking mode determining unit 93 (step ST103), or when it is determined by the determination at the steering direction determining unit 99 that the vehicle 1 is steered neither to the left (step ST105) nor to the right (step ST107), the stabilization braking mode determining unit 93 determines whether or not M2, which is the previous value of M1, is not OFF, and M1 is OFF (step ST111).

Specifically, M2 indicates the previous mode of the stabilization braking mode M1. Therefore, it is determined whether the stabilization braking is executed or not in the previous process by determining whether M2≠OFF or not by the stabilization braking mode determining unit 93, and further, it is determined whether the current stabilization braking mode M1 is set to be OFF or not. When it is determined that M2≠OFF is not established or M1=OFF is not established according to the determination, i.e., when it is determined that the stabilization braking is not executed previously or the stabilization braking mode is currently not OFF, the procedure proceeds to a later-described step ST113.

When it is determined that M2≠OFF is established and M1=OFF is established according to the determination (step ST111) by the stabilization braking mode determining unit 93, the stabilization braking once-execution flag F1, which is the flag indicating that the stabilization braking is executed once, is set to be ON (step ST112). The stabilization braking flag setting unit 94 of the processing unit 81 in the ECU 80 performs this setting. Specifically, when M2≠OFF is established and M1=OFF is established, the stabilization braking is executed previously, so that the stabilization braking flag setting unit 94 changes the stabilization braking once-execution flag F1 stored in the storage unit 110 in the ECU 80, whereby the stabilization braking once-execution flag F1 is set to be ON.

When the stabilization braking flag setting unit 94 sets the stabilization braking once-execution flag F1 to be ON, or it is determined by the stabilization braking mode determining unit 93 (step ST111) that M2 ≠OFF is not established or M1=OFF is not established, it is then determined whether F1 is ON or not (step ST113). The stabilization braking flag determining unit 95 makes this determination. The stabilization braking flag determining unit 95 determines whether the stabilization braking once-execution flag F1 stored in the storage unit 110 in the ECU 80 is in ON-state or not. When the stabilization braking flag determining unit 95 determines that the stabilization braking once-execution flag F1 is not ON, the procedure proceeds to a later-described step ST115.

On the other hand, when the F1 is determined to be ON by the determination at the stabilization braking flag determining unit 95 (step ST113), an F1 flag elapsed time C1, which is the elapsed time during when the F1 is in ON state, is calculated so as to calculate C1=C1+1 (step ST114). The flag elapsed time calculating unit 96 of the processing unit 81 in the ECU 80 performs this calculation. The flag elapsed time calculating unit 96 adds 1 to the F1 flag elapsed time C1 stored in the storage unit 110 in the ECU 80, and allows the storage unit 110 to store the resultant again.

When the flag elapsed time calculating unit 96 calculates C1=C1+1, or when it is determined that the stabilization braking once-execution flag F1 is not in ON state by the determination at the stabilization braking flag determining unit 95 (step ST113), as described above, it is then determined whether the F1 flag elapsed time C1 is greater than a stabilization braking inhibition maximum time T1, which is the inhibition time of the stabilization braking after the execution of the stabilization braking (step ST115). The inhibition time lapse determining unit 97 of the processing unit 81 in the ECU 80 makes this determination. The inhibition time lapse determining unit 97 compares the F1 flag elapsed time C1 stored in the storage unit 110 and the stabilization braking inhibition maximum time T1, which is set and stored in the storage unit 110 in the ECU 80 beforehand as the time for inhibiting the stabilization braking, so as to determine whether an inequality of C1>T1 is established or not. When it is determined that the inequality of C1>T1 is not established by the determination, the procedure proceeds to a later-described step ST117.

When it is determined that the inequality of C1>T1 is established by the determination at the inhibition time lapse determining unit 97 (step ST115), the stabilization braking flag setting unit 94 then sets the F1 to be OFF, and the flag elapsed time calculating unit sets C1 to be 0 (step ST116). Specifically, when the F1 flag elapsed time C1 exceeds the stabilization braking inhibition maximum time T1, the stabilization braking can be executed. Therefore, the stabilization braking once-execution flag F1 indicating that the stabilization braking is executed once is turned OFF, and the F1 flag elapsed time C1 is reset.

When F1 is set to be OFF, and C1 is set to be 0 as described above, or when it is determined that the inequality of C1>T1 is not established by the determination at the inhibition time lapse determining unit (step ST115), the M2 that is the previous value of the M1 is set to be the setting state of the current stabilization braking mode M1 by the stabilization braking mode setting unit 92 (step ST117). The content of the M1 is put into the M2, whereby the content of the M2 is changed to the content of the current M1.

Then, it is determined whether it is the state in which the stabilization braking is maintained or not (step ST118). The stabilization braking maintenance determining unit 100 of the processing unit 81 in the ECU 80 makes this determination. When the stabilization braking maintenance determining unit 100 determines whether it is the state in which the stabilization braking is maintained or not, this determination is made based upon the stabilization braking once-execution flag F1 and the absolute value absStr of the steering angle. When the state of the stabilization braking once-execution flag F1 is determined, the stabilization braking flag determining unit 95 determines whether the F1 is ON or not, thereby determining whether the turning-back steering is executed or not based upon the operation state of the stabilization braking. When the state of the absolute value absStr of the steering angle is determined, the steering state determining unit 98 compares the absolute value absStr of the steering angle and the Ths1 that is the threshold value of the absolute value of the steering angle so as to determine whether an inequality of absStr>Ths1 is established or not. Further, the steering state determining unit 98 compares an absolute value of the difference between absStrL, which is the previous value of the absolute value of the steering angle, and absStr that is the absolute value of the current steering angle, and Ths2 that is the threshold value of the difference between the previous steering angle and the current steering angle so as to determine whether an inequality of |absStrL−absStr|<Ths2 is established or not.

When it is determined that the F1 is ON, and both inequalities of absStr>Ths1 and |absStrL−absStr|<Ths2 are satisfied, the stabilization braking maintenance determining unit 100 determines that the stabilization braking is maintained. Specifically, the case in which the F1 is ON indicates that the stabilization braking is executed once, which means the turning-back steering is performed. The case in which the inequality of absStr>Ths1 is satisfied indicates that the steering angle is not less than the predetermined value, while the case in which the inequality of |absStrL−absStr|<Ths2 is established indicates that the change in the steering angle is smaller than a predetermined change. Specifically, the case in which both inequalities of absStr>Ths1 and |absStrL−absStr|<Ths2 are satisfied indicates that the steering angle is kept with the value not less than the predetermined value. When it is determined that the turning-back steering is executed as described above, and the steering angle is held with the predetermined steering angle, the stabilization braking maintenance determining unit 100 determines that the stabilization braking is maintained. In other words, when it is determined that the turning-back steering is executed, and the steering angle is held with the steering angle not less than the predetermined value, it can be determined that the steering angle in the second steering during the turning-back steering is maintained. Therefore, in this case, it is determined that the stabilization braking is maintained. When the stabilization braking is determined not to be maintained according to this determination, the apparatus leaves the procedure.

When it is determined that the stabilization braking is maintained by the determination at the stabilization braking maintenance determining unit 100 (step ST118), the control amount in the behavior stabilization control is maintained (step ST119). The brake device controlling unit 88 performs the maintenance of the control amount in the behavior stabilization control. When the control amount in the behavior stabilization control is maintained by the brake device controlling unit 88, the control amount ds of the behavior stabilization control is set to be MAX (ds, dsL) to control the brake actuator 50. In other words, the grater one of the control amount ds calculated from the behavior estimated by the current yaw rate Yr of the vehicle 1 and the dsL that is the ds previously calculated is selected as the control amount ds of the current behavior stabilization control, and calculated as the control amount ds.

Since the equation of ds=MAX (ds, dsL) is calculated, and the greater one of the control amount ds calculated by the current behavior and the previous control amount dsL is selected as the control amount ds, the control amount of the behavior stabilization control is maintained, even if the behavior of the vehicle 1 is reduced. Even if the behavior of the vehicle 1 in the yaw direction becomes small, the brake device controlling unit 88 controls the brake actuator 50 with this control amount ds, whereby the braking force can continuously be generated with the state in which the amount of the reduction in the braking force is limited with respect to the front wheel 6 at the outside of the turn by the second steering in the turning-back steering. Specifically, when the brake device controlling unit 88 performs the stabilization braking, it compares the current control amount ds during the control of the current stabilization braking and the previous control amount of the current control amount, such as the previous control amount dsL, in the current stabilization braking, and selects the greater one as the current control amount ds, thereby maintaining the braking force generated on the front wheel 6 at the outside of the turn by the second steering during the turning-back steering. Thus, the stabilization braking is maintained with the braking force in case where it is determined that the steering angle in the second steering during the turning-back steering is held.

In the vehicle behavior controlling apparatus 2 described above, when the steering state determining unit 98 determines that the steering angle in the second steering during when the turning-back steering is executed is held, the brake device controlling unit 88 controls the brake device 30, whereby the stabilization braking is executed in such a manner that the braking force is generated on the front wheel 6, which is at the side reverse to the steering direction by the second steering during the turning-back steering, and the limitation is imposed on the amount of the reduction in the braking force during when the steering angle in the second steering is held. Accordingly, even if the yaw moment is increased upon the steering of the second steering during the turning-back steering, the braking force is generated on the front wheel 6 at the outside of the turn, whereby the yaw moment in the direction reverse to the direction of the yaw moment by the steering can be generated, resulting in that the yaw moment by the steering can be reduced. Consequently, this can prevent that the yaw rate excessively increases due to the yaw moment, which is easy to increase upon the steering of the second steering during the turning-back steering, with the result that the unstable behavior of the vehicle 1 can be prevented. As a result, the stability of the behavior during the turning-back steering can be enhanced.

Since the steering state determining unit 98 determines that the steering angle in the second steering during when the turning-back steering is executed is held, when the turning-back steering is executed, the steering angle is greater than the predetermined value, and the change of the steering angle is smaller than the predetermined change, the timing of performing the stabilization braking can more appropriately be determined. This can appropriately prevent that the behavior of the vehicle 1 becomes unstable. Specifically, in the case of the normal steering, for example, the yaw moment is difficult to increase compared to the yaw moment due to the second steering in the turning-back steering. Therefore, when the weak braking force is generated on the front wheel 6 at the outside of the turn during the normal steering, and the braking force is continuously maintained during when the steering angle is held, the yaw moment becomes small more than necessary, so that the vehicle 1 might be difficult to turn. Accordingly, the steering state determining unit 98 appropriately determines the second steering in the turning-back steering, thereby being capable of appropriately determining the state in which the yaw moment is easy to increase. Since the stabilization braking is performed in this case, the yaw moment, which is easy to increase, can appropriately be reduced, which can prevent that the behavior of the vehicle 1 becomes unstable. As a result, the stability of the behavior in the turning-back steering can appropriately be enhanced without reducing the running property of the vehicle 1.

When the stabilization braking is performed, the brake device controlling unit 88 compares the current control amount ds in the control of the current stabilization braking and the previous control amount of the current control amount ds, such as the previous control amount dsL, in the current stabilization braking, and selects the greater one as the current control amount ds, whereby the limitation is imposed on the amount of the reduction in the braking force. Therefore, the control amount upon performing the stabilization braking can be maintained, regardless of the state amount of the behavior, such as the yaw rate, during the turning-back steering. Accordingly, since the braking force is controlled based upon this control amount upon performing the stabilization braking, the braking force can more appropriately be generated when the steering angle in the second steering during the turning-back steering is held, resulting in that the braking force can be maintained. As a result, the stability in the behavior during the turning-back steering can more surely be enhanced.

Since the braking force is generated on the front wheel 6 at the outside of the turn in the second steering by executing the stabilization braking, when the steering angle of the second steering in the turning-back steering is held, the yaw rate increases in the second steering during the turning-back steering. Therefore, even if the behavior of the vehicle 1 becomes unstable such as in the spin mode, the braking force generated on the front wheel 6 can be increased in a short period. Thus, the yaw moment in the direction reverse to the direction of the yaw moment generated by the second steering can be generated in a short period, whereby the increased yaw rate can be decreased. Accordingly, the unstable behavior of the vehicle 1 can be stabilized in a short period. As a result, the stability in the behavior during the turning-back steering can more surely be enhanced.

Second Embodiment

Figure 6:
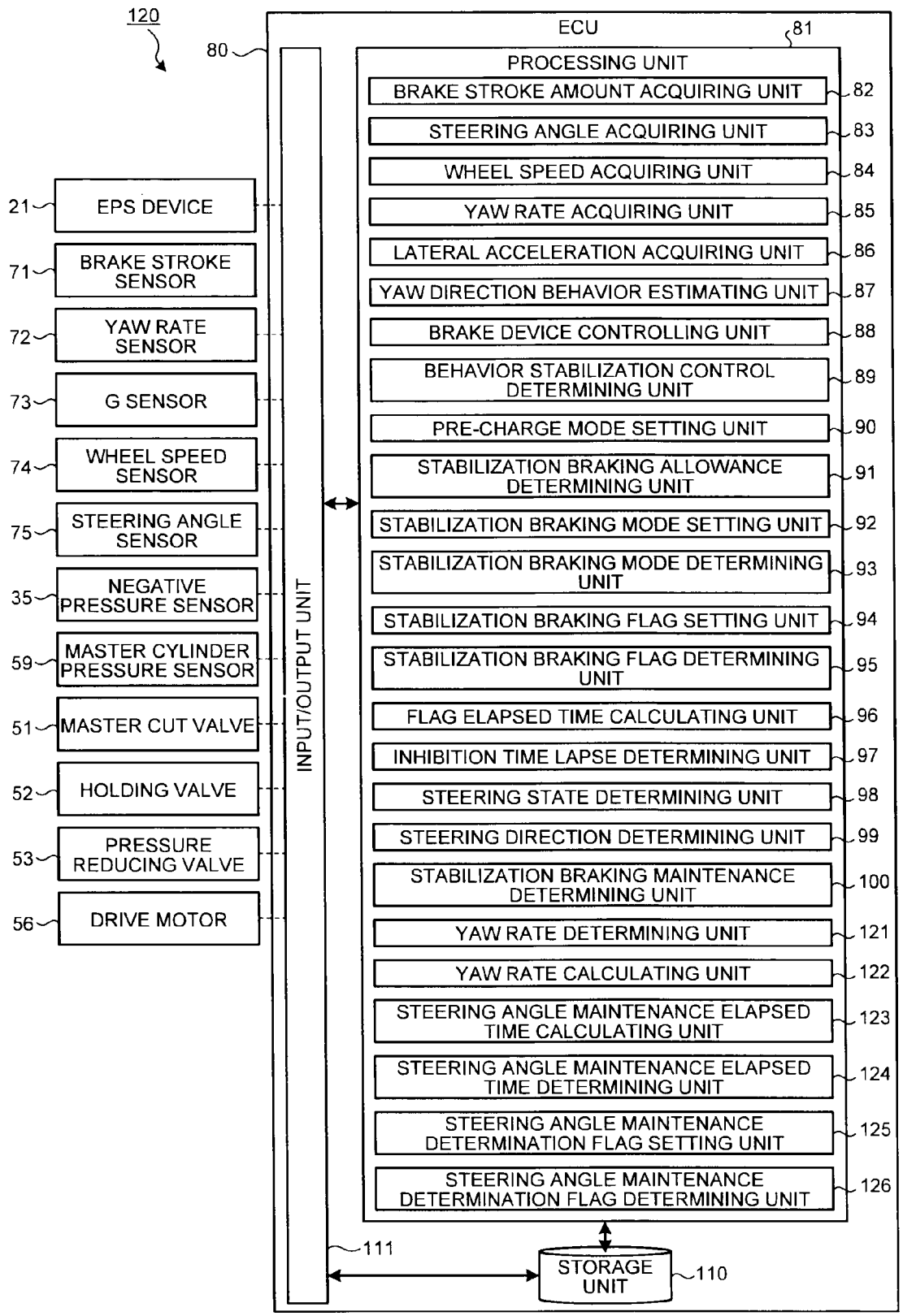
FIG. 6 is a diagram illustrating a configuration of an essential part of a vehicle behavior controlling apparatus according to a second embodiment.
Figures 1, 7:
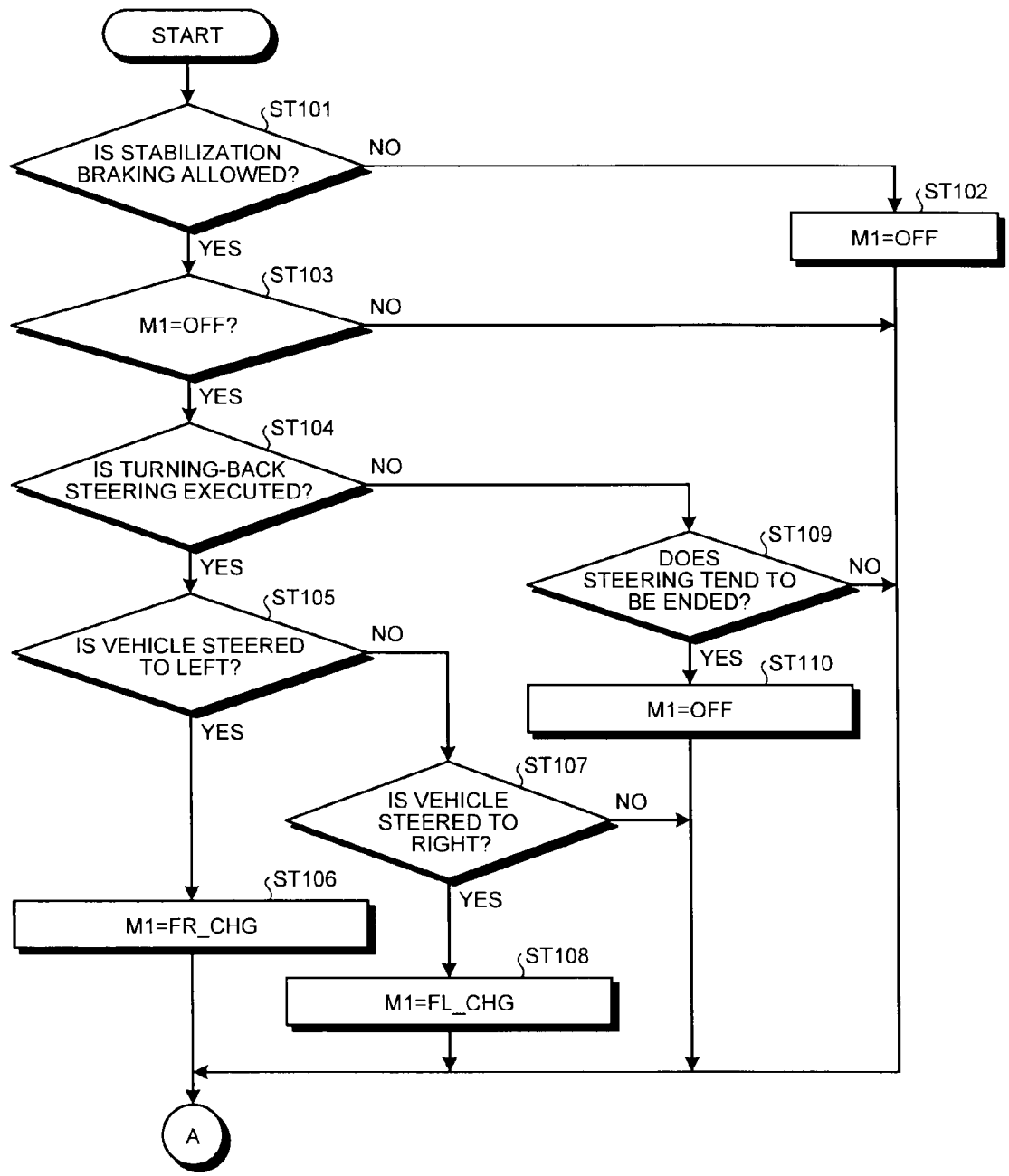
Figures 2, 7:
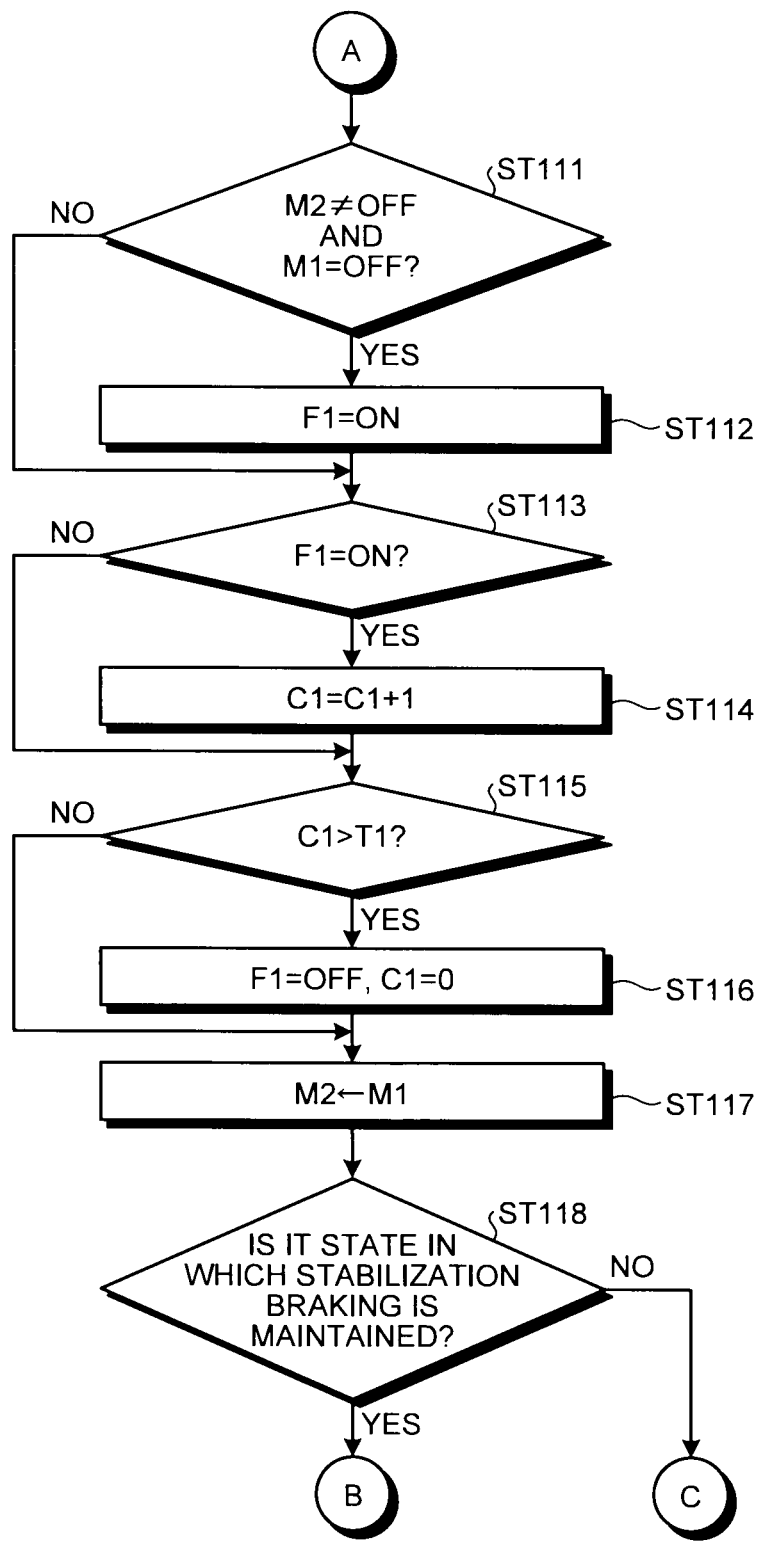
Figures 3, 7:
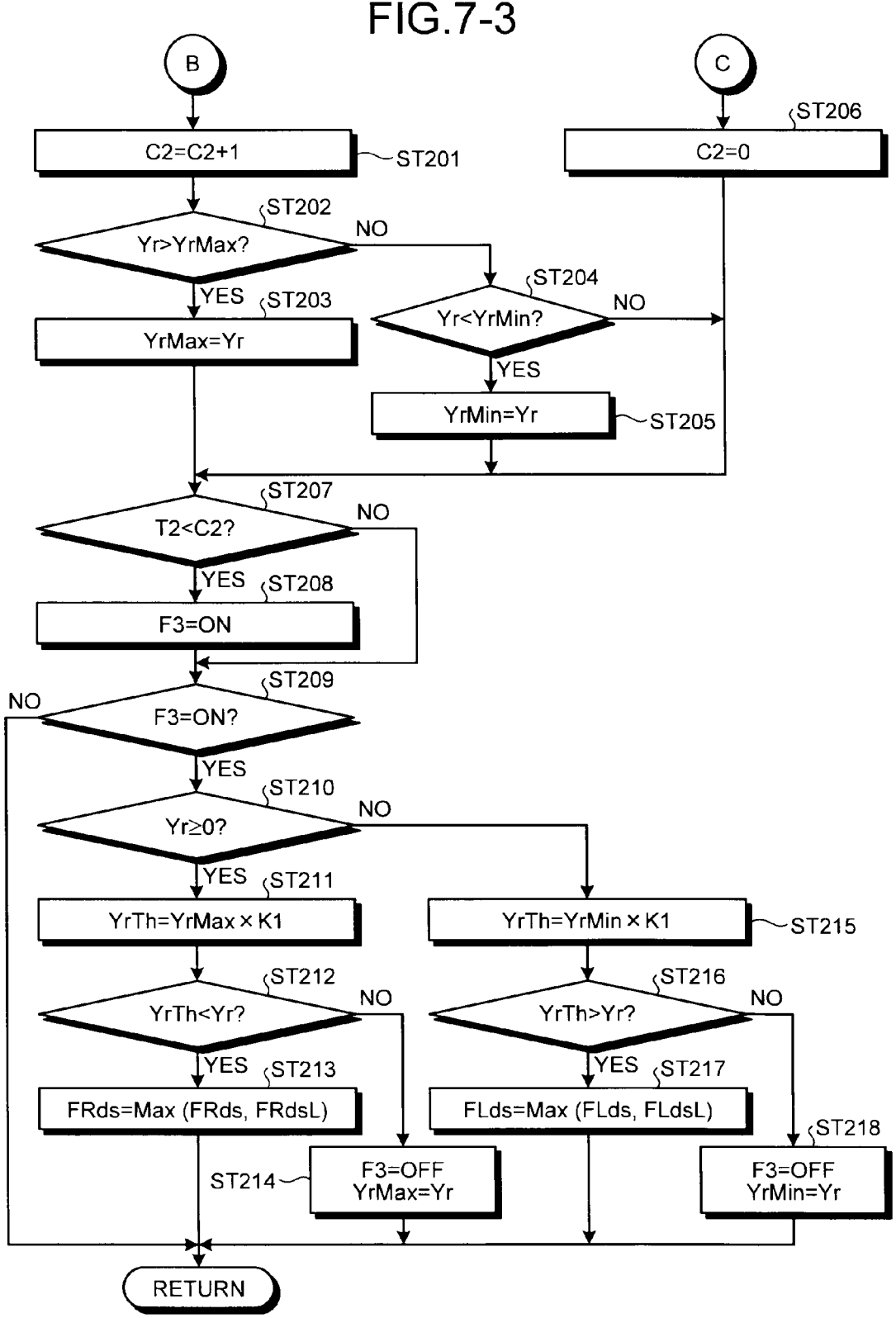

A vehicle behavior controlling apparatus 120 according to a second embodiment has substantially the same configuration as the vehicle behavior controlling apparatus 2 in the first embodiment, but it has a feature of using a yaw rate as a condition of canceling the stabilization braking. The other configurations are the same as those in the first embodiment, so that the description will be skipped, and the components are identified by the same reference numerals. FIG. 6 is a diagram illustrating a configuration of an essential part of the vehicle behavior controlling apparatus according to the second embodiment. When the steering angle in the second steering during the turning-back steering is held, the vehicle behavior controlling apparatus 120 according to the second embodiment is configured to be capable of performing the stabilization braking, which is the control in which the braking force is generated on the front wheel 6 at the side reverse to the steering direction in the second steering, and the braking force is maintained during when the steering angle in the second steering is held. Therefore, the processing unit 81 in the ECU 80 includes the brake stroke amount acquiring unit 82, the steering angle acquiring unit 83, the wheel speed acquiring unit 84, the yaw rate acquiring unit 85, the lateral acceleration acquiring unit 86, a yaw direction behavior estimating unit 87, the brake device controlling unit 88, the behavior stabilization control determining unit 89, the precharge mode setting unit 90, the stabilization braking allowance determining unit 91, the stabilization braking mode setting unit 92, the stabilization braking mode determining unit 93, the stabilization braking flag setting unit 94, the stabilization braking flag determining unit 95, the flag elapsed time calculating unit 96, the inhibition time lapse determining unit 97, the steering state determining unit 98, the steering direction determining unit 99, and the stabilization braking maintenance determining unit 100.

The vehicle behavior controlling apparatus 120 according to the second embodiment ends the stabilization braking based upon the state of the yaw rate, when it executes the stabilization braking. Therefore, in the vehicle behavior controlling apparatus 120 according to the second embodiment, the processing unit 81 in the ECU 80 further includes a yaw rate determining unit 121 serving as a yaw rate determining means that determines the state of the yaw rate acquired by the yaw rate acquiring unit 85, a yaw rate calculating unit 122 serving as a yaw rate calculating means that makes various calculations upon performing the control of the stabilization braking by using the yaw rate, a steering angle maintenance elapsed time calculating unit 123 that is a steering angle maintenance elapsed time calculating means that calculates a steering angle maintenance elapsed time, which is an elapsed time during when the steering angle is maintained during the turning-back steering, a steering angle maintenance elapsed time determining unit 124 serving as a steering angle maintenance elapsed time determining means that compares the steering angle maintenance elapsed time calculated by the steering angle maintenance elapsed time calculating unit 123 and a predetermined time that is a reference so as to determine the length of the steering angle maintenance elapsed time, a steering angle maintenance determination flag setting unit 125 serving as a steering angle maintenance determination flag setting means that sets a steering angle maintenance determination flag indicating the result of the determination of the maintenance state of the steering angle, and a steering angle maintenance determination flag determining unit 126 serving as a steering angle maintenance determination flag determining means that determines the state of the current steering angle maintenance determination flag.

The vehicle behavior controlling apparatus 120 according to the second embodiment is thus configured, and its operation will be described below. During when the turning-back steering is executed during the travel of the vehicle 1, and the second steering is held, the stabilization braking is maintained like the vehicle behavior controlling apparatus 2 according to the first embodiment. However, in the vehicle behavior controlling apparatus 120 according to the second embodiment, the stabilization braking is ended when the yaw rate during the turn due to the second steering is reduced from a peak value by a predetermined amount or more.

Specifically, the peak value of the yaw rate during the turn is set, and the yaw rate acquiring unit 85 acquires the yaw rate during the turn due to the second steering in the turning-back steering. When the acquired yaw rate is greater than the peak value of the yaw rate, the acquired yaw rate is set as the peak value of the yaw rate by the yaw rate calculating unit 122, whereby the peak value of the yaw rate is updated. When the yaw rate determining unit 121 determines that the yaw rate acquired by the yaw rate acquiring unit 85 is smaller than the peak value of the yaw rate, which is updated every time the acquired yaw rate increases, by the predetermined amount or more, the stabilization braking is ended. It is to be noted that the peak value of the yaw rate during the left turn and the peak value of the yaw rate during the right turn are independently set.

Therefore, when the turn by the second steering in the turning-back steering is the left turn, the yaw rate determining unit 121 of the processing unit 81 in the ECU 80 determines whether or not the yaw rate exceeds the peak value and reduces by the predetermined amount or more based upon the yaw rate acquired at the yaw rate acquiring unit 85 and the peak value of the yaw rate during the left turn. When it is determined that the yaw rate does not exceed the peak value and reduce by the predetermined amount or more by this determination, the brake device controlling unit 88 continuously generates the braking force on the front-right wheel 6R so as to maintain the stabilization braking. When it is determined that the yaw rate exceeds the peak value and reduces by the predetermined amount or more, the stabilization braking is ended.

When the turn by the second steering in the turning-back steering is the right turn, the yaw rate determining unit 121 similarly determines whether the yaw rate exceeds the peak value and reduces by the predetermined amount or more based upon the yaw rate acquired at the yaw rate acquiring unit 85 and the peak value of the yaw rate during the right turn. When it is determined that the yaw rate does not exceed the peak value and reduce by the predetermined amount or more by this determination, the brake device controlling unit 88 continuously generates the braking force on the front-left wheel 6L so as to maintain the stabilization braking. When it is determined that the yaw rate exceeds the peak value and reduces by the predetermined amount or more, the stabilization braking is ended.

Specifically, the brake device controlling unit 88 ends the stabilization braking when the yaw rate during the stabilization braking acquired at the yaw rate acquiring unit 85 is reduced from the peak value of the yaw rate by the predetermined amount or more.

FIGS. 7-1, 7-2, and 7-3 are flowcharts illustrating the procedure of the vehicle behavior controlling apparatus according to the second embodiment. Next, the control method of the vehicle behavior controlling apparatus 120 according to the second embodiment, i.e., the procedure of the vehicle behavior controlling apparatus 120, will be described. The processes from the step (step ST101) of determining whether the stabilization braking executed by the stabilization braking allowance determining unit 91 is allowed or not to the step (step ST118) of determining whether it is the state in which the stabilization braking is maintained or not by the stabilization braking maintenance determining unit 100 are the same as those in the procedure of the vehicle behavior controlling apparatus 2 according to the first embodiment, so that the description will not be repeated here.

When it is determined that the stabilization braking is maintained by the stabilization braking maintenance determining unit 100 (step ST118), a steering angle maintenance elapsed time C2 that is the elapsed time with the steering angle being held is calculated so as to calculate the equation of C2=C2+1 (step ST201). The steering angle maintenance elapsed time calculating unit 123 of the processing unit 81 in the ECU 80 makes this calculation. The steering angle maintenance elapsed time calculating unit 123 adds 1 to the steering angle maintenance elapsed time C2, which is stored in the storage unit 110 of the ECU 80, and allows the storage unit 110 to again store the resultant.

Then, the yaw rate Yr and a Yr-left-turn peak value YrMax, which is the peak value of the yaw rate Yr during the left turn, are compared so as to determine whether an inequality of Yr>YrMax is established or not (step ST202). The yaw rate determining unit 121 of the processing unit 81 in the ECU 80 makes this determination. The Yr-left-turn peak value YrMax is the peak value of the yaw rate Yr generated when the vehicle 1 turns to the left. Every time the yaw rate Yr during the travel of the vehicle 1 exceeds the Yr-left-turn peak value YrMax, the Yr-left-turn peak value YrMax is appropriately updated, and stored in the storage unit 110 in the ECU 80. The yaw rate determining unit 121 compares the Yr-left-turn peak value YrMax stored in the storage unit 110 and the yaw rate Yr acquired by the yaw rate acquiring unit 85 so as to determine whether the inequality of Yr>YrMax is established or not as described above.

When it is determined that the inequality of Yr>YrMax is established by the determination at the yaw rate determining unit 121 (step ST202), the equation of YrMax=Yr is calculated (step ST203). The yaw rate calculating unit 122 of the processing unit 81 in the ECU 80 makes this calculation. When it is determined that the inequality of Yr>YrMax is established by the determination at the yaw rate determining unit 121, the yaw rate calculating unit 122 changes the Yr-left-turn peak value YrMax stored in the storage unit 110 to the yaw rate Yr acquired by the yaw rate acquiring unit 85, thereby updating the Yr-left-turn peak value YrMax.

On the other hand, when it is determined that the inequality of Yr>YrMax is not established by the determination at the yaw rate determining unit 121 (step ST202), the yaw rate Yr and an Yr-right-turn peak value YrMin, which is the peak value of the yaw rate Yr during the right turn, are compared so as to determine whether an inequality of Yr<YrMin is established or not at the yaw rate determining unit (step ST204). The Yr-right-turn peak value YrMin is the peak value of the yaw rate Yr generated when the vehicle 1 turns to the right. Every time the yaw rate Yr during the travel of the vehicle 1 lowers the Yr-right-turn peak value YrMin, the Yr-right-turn peak value YrMin is appropriately updated, and stored in the storage unit 110 in the ECU 80. Since the sign of the yaw rate Yr is negative during the right turn, the numerical value of the yaw rate Yr during the right turn decreases as the state amount increases. Therefore, when the yaw rate Yr is less than the Yr-right-turn peak value YrMin, the state amount of the yaw rate Yr is greater than the Yr-right-turn peak value YrMin.

As described above, the yaw rate determining unit 121 compares the Yr-right-turn peak value YrMin stored in the storage unit 110 and the yaw rate Yr acquired by the yaw rate acquiring unit 85 so as to determine whether an inequality of Yr<YrMin is established or not. When it is determined that the inequality of Yr<YrMin is not established by this determination, i.e., when it is determined that the yaw rate Yr acquired by the yaw rate acquiring unit 85 exceeds neither the Yr-left-turn peak value YrMax nor the Yr-right-turn peak value YrMin, the procedure proceeds to a later-described step ST207.

When it is determined that the inequality of Yr<YrMin is established by the determination at the yaw rate determining unit 121 (step ST204), the yaw rate calculating unit 122 calculates the equation of YrMin=Yr (step ST205). When it is determined that the inequality of Yr<YrMin is established by the determination at the yaw rate determining unit 121, the yaw rate calculating unit 122 changes the Yr-right-turn peak value YrMin stored in the storage unit 110 to the yaw rate Yr acquired by the yaw rate acquiring unit 85, thereby updating the Yr-right-turn peak value YrMin.

When it is determined that the stabilization braking is not maintained by the determination at the stabilization braking maintenance determining unit 100 (step ST118), the steering angle maintenance elapsed time C2 is calculated to calculate the equation of C2=0 (step ST206). The steering angle maintenance elapsed time calculating unit 123 makes this calculation. The steering angle maintenance elapsed time calculating unit 123 sets the value of the steering angle maintenance elapsed time C2 stored in the storage unit 110 in the ECU 80 to be 0, and then, allows the storage unit 110 to store again the resultant.

When it is determined that the yaw rate Yr exceeds neither the Yr-left-turn peak value YrMax nor the Yr-right-turn peak value YrMin by the yaw rate determining unit 121 (steps ST202, ST204), when the Yr-left-turn peak value YrMax is updated (step ST203) or the Yr-right-turn peak value YrMin is updated (step ST205) by the calculation at the yaw rate calculating unit 122, or when the steering angle maintenance elapsed time calculating unit 123 calculates the equation of C2=0 (step ST206), a steering angle maintenance elapsed continuation maximum time T2, which is the maximum time of the elapsed time during when the steering angle is held, and the steering angle maintenance elapsed time C2 are compared so as to determine whether an inequality of T2<C2 is established or not (step ST207). The steering angle maintenance elapsed time determining unit 124 of the processing unit 81 in the ECU 80 makes this determination. The steering angle maintenance elapsed time determining unit 124 compares the steering angle maintenance elapsed time C2 stored in the storage unit 110 and the steering angle maintenance elapsed continuation maximum time T2, which is set beforehand as the steering angle maintenance elapsed continuation maximum time and stored in the storage unit 110 in the ECU 80, in order to determine whether the inequality of T2<C2 is established or not. When it is determined that the inequality of T2<C2 is not established by this determination, the procedure proceeds to a later-described step ST209.

When it is determined that the inequality of T2<C2 is established by the determination at the steering angle maintenance elapsed time determining unit 124 (step ST207), a steering angle maintenance determination flag F3, which is a flag indicating the result of the determination of the maintenance state of the steering angle, is turned ON (step ST208). The steering angle maintenance determination flag setting unit 125 of the processing unit 81 in the ECU 80 makes this setting. When it is determined that the inequality of T2<C2 is established by the determination at the steering angle maintenance elapsed time determining unit 124, the steering angle maintenance determination flag setting unit 125 changes the steering angle maintenance determination flag F3 stored in the storage unit 110 in the ECU 80, thereby setting the steering angle maintenance determination flag F3 to be ON.

When the steering angle maintenance determination flag F3 is set to be ON by the steering angle maintenance determination flag setting unit 125, or when it is determined that the inequality of T2<C2 is not established by the determination at the steering angle maintenance elapsed time determining unit 124 (step ST207), it is then determined whether the F3 is turned ON or not (step ST209). The steering angle maintenance determination flag determining unit 126 of the processing unit 81 in the ECU 80 makes this determination. The steering angle maintenance determination flag determining unit 126 determines whether the steering angle maintenance determination flag F3 stored in the storage unit 110 is turned ON or not. When it is determined that the F3 is not turned ON by this determination, the apparatus leaves this procedure.

When it is determined that the F3 is turned ON by the determination at the steering angle maintenance determination flag determining unit 126 (step ST209), the yaw rate determining unit 121 determines whether the inequality of the yaw rate Yr≥0 or not (step ST210). The yaw rate determining unit 121 determines whether the yaw rate Yr acquired by the yaw rate acquiring unit 85 is not less than 0 or not. When it is determined that the inequality of the yaw rate Y≥0 is not established by this determination, the procedure proceeds to a later-described step ST215.

When it is determined that the inequality of the yaw rate Yr≥0 is established by the determination at the yaw rate determining unit 121 (step ST210), the yaw rate calculating unit 122 makes the calculation of an Yr-convergence determination threshold value YrTh, which is a threshold value for determining whether the yaw rate Yr is converged or not, in order to calculate YrTh=YrMax×K1 (step ST211). Specifically, the yaw rate calculating unit 122 multiplies the Yr-left-turn peak value YrMax stored in the storage unit 110 by a Yr-peak-attenuation ratio K1, which is set and stored beforehand in the storage unit 110 as a constant of a ratio in case where the yaw rate Yr attenuates from the peak value, thereby calculating the Yr-convergence determination threshold value YrTh. The Yr-convergence determination threshold value YrTh calculated as described above is used for determining whether the yaw rate Yr exceeds the peak value and reduces by the predetermined amount or more or not, when the second steering in the turning-back steering is the steering to the left. The predetermined value used for this determination is the difference between the YrMax and the YrTh.

Then, the yaw rate determining unit 121 determines whether an inequality of YrTh<Yr is established or not (step ST212). The yaw rate determining unit 121 compares the Yr-convergence determination threshold value YrTh calculated at the yaw rate calculating unit 122 and the yaw rate Yr acquired at the yaw rate acquiring unit 85 in order to determine whether the inequality of YrTh<Yr is established or not.

When it is determined that the inequality of YrTh<Yr is established by the determination at the yaw rate determining unit 121 (step ST212), the brake device controlling unit 88 maintains the control amount of the front-right wheel 6R in the behavior stabilization control (step ST213). Specifically, when it is determined that the inequality of YrTh<Yr is established, the yaw rate Yr can be determined not to be reduced from the peak value by the predetermined amount or more. Therefore, the control amount when the second steering in the turning-back steering maintains the stabilization braking during the left turn, i.e., the control amount of the front-right wheel 6R in the behavior stabilization control, is maintained.

Specifically, when the brake device controlling unit 88 maintains the control amount of the front-right wheel 6R in the behavior stabilization control, a front-right wheel control amount FRds, which is the control amount of the braking force on the front-right wheel 6R in the behavior stabilization control, is set as FRds=MAX (FRds, FRdsL) so as to control the brake actuator 50. In other words, the greater one of the front-right wheel control amount FRds, which is calculated from the behavior estimated by the current yaw rate Yr of the vehicle 1, and the FRdsL that is the FRds previously calculated is selected as the control amount of the braking force on the front-right wheel 6R in the current behavior stabilization control, and calculated as the front-right wheel control amount FRds.

As described above, FRds=MAX (FRds, FRdsL) is calculated, and the greater one of the front-right wheel control amount FRds calculated from the current behavior and the FRdsL that is the previous front-right wheel control amount is selected as the front-right wheel control amount FRds, whereby the control amount in the behavior stabilization control is maintained even if the behavior of the vehicle 1 that is turned to the left by the second steering in the turning-back steering is reduced. Since the brake device controlling unit 88 controls the brake actuator 50 with the front-right wheel control amount FRds, the braking force can be continuously generated on the front-right wheel 6R that is the front wheel 6 located at the outside during the left turn, even if the behavior in the yaw direction during the left turn is reduced.

Specifically, when the stabilization braking is performed in case where the second steering in the turning-back steering is the steering to the left, the brake device controlling unit 88 compares the current front-right wheel control amount FRds during the current control of the stabilization braking and the previous control amount of the current control amount in the current stabilization braking, such as the previous front-right wheel control amount FRdsL, and sets the greater one as the current front-right wheel control amount FRds, thereby maintaining the braking force generated on the front-right wheel 6R. Thus, the stabilization braking in case where the second steering in the turning-back steering is the steering to the left is maintained.

On the other hand, when it is determined that the inequality of YrTh<Yr is not established by the determination at the yaw rate determining unit 121 (step ST212), the steering angle maintenance determination flag setting unit 125 turns OFF the steering angle maintenance determination flag F3, and the yaw rate calculating unit calculates YrMax=Yr (step ST214). Specifically, when it is determined that the inequality of YrTh<Yr is not established, it can be determined that the yaw rate Yr exceeds the peak value, and decreases by the predetermined amount or more. Therefore, in this case, it can be determined that the second steering in the turning-back steering is turned back, and the maintenance of the steering angle is ended, whereby the steering angle maintenance determination flag setting unit 125 sets the steering angle maintenance determination flag F3 to be OFF. Thus, the stabilization braking is ended. Since the yaw rate Yr tends to decrease in this case, the yaw rate calculating unit 122 calculates YrMax=Yr in order to process the current yaw rate Yr as the peak value of this steering in the control afterward.

On the other hand, when it is determined that the inequality of the yaw rate Yr≥0 is not established by the determination at the yaw rate determining unit 121 (step ST210), the yaw rate calculating unit 122 makes the calculation of the Yr-convergence determination threshold value YrTh so as to calculate YrTh=YrMin×K1 (step ST215). In other words, the yaw rate calculating unit 122 multiplies the Yr-right-turn peak value YrMin stored in the storage unit 110 by the Yr-peak-attenuation ratio K1, thereby calculating the Yr-convergence determination threshold value YrTh. The Yr-convergence determination threshold value YrTh calculated as described above is used for determining whether the yaw rate Yr exceeds the peak value and reduces by the predetermined amount or more or not, when the second steering in the turning-back steering is the steering to the right. The predetermined value used for this determination is the difference between the YrMin and the YrTh.

Then, the yaw rate determining unit 121 determines whether an inequality of YrTh>Yr is established or not (step ST216) by comparing the Yr-convergence determination threshold value YrTh calculated at the yaw rate calculating unit 122 and the yaw rate Yr acquired at the yaw rate acquiring unit.

When it is determined that the inequality of YrTh>Yr is established by the determination at the yaw rate determining unit 121 (step ST216), the brake device controlling unit 88 maintains the control amount of the front-left wheel 6L in the behavior stabilization control (step ST217). Specifically, when it is determined that the inequality of YrTh>Yr is established, the yaw rate Yr can be determined not to be reduced from the peak value by the predetermined amount or more. Therefore, the control amount when the second steering in the turning-back steering maintains the stabilization braking during the right turn, i.e., the control amount of the front-left wheel 6L in the behavior stabilization control, is maintained.

Specifically, when the brake device controlling unit 88 maintains the control amount of the front-left wheel 6L in the behavior stabilization control, a front-left wheel control amount FLds, which is the control amount of the braking force on the front-left wheel 6L in the behavior stabilization control, is set as FLds=MAX (FLds, FLdsL) so as to control the brake actuator 50, like the case of maintaining the control amount of the front-right wheel (step ST213). In other words, the greater one of the front-left wheel control amount FLds, which is calculated based upon the yaw rate Yr of the vehicle 1, and the FLdsL that is the FLds previously calculated is selected and calculated as the front-left wheel control amount FLds.

As described above, FLds=MAX (FLds, FLdsL) is calculated, whereby the control amount in the behavior stabilization control is maintained even if the behavior of the vehicle 1 that is steered to the right by the second steering in the turning-back steering is reduced. Since the brake device controlling unit 88 controls the brake actuator 50 with the front-left wheel control amount FLds, the braking force is continuously generated on the front-left wheel 6L that is the front wheel 6 located at the outside during the right turn, even if the behavior in the yaw direction in the right turn is reduced.

Specifically, when the stabilization braking is performed in case where the second steering in the turning-back steering is the steering to the right, the brake device controlling unit 88 compares the current front-left wheel control amount FLds during the current control of the stabilization braking and the previous control amount of the current control amount in the current stabilization braking, such as the previous front-left wheel control amount FLdsL, and sets the greater one as the current front-left wheel control amount FLds, thereby maintaining the braking force generated on the front-left wheel 6L. Thus, the stabilization braking in case where the second steering in the turning-back steering is the steering to the right is maintained.

On the other hand, when it is determined that the inequality of YrTh>Yr is not established by the determination at the yaw rate determining unit 121 (step ST216), the steering angle maintenance determination flag setting unit 125 turns OFF the steering angle maintenance determination flag F3, and the yaw rate calculating unit calculates YrMin=Yr (step ST218). Specifically, it can be determined that the yaw rate Yr exceeds the peak value, and decreases by the predetermined amount or more. Therefore, in this case, the steering angle maintenance determination flag setting unit 125 sets the steering angle maintenance determination flag F3 to be OFF. Thus, the stabilization braking is ended. Since the yaw rate Yr tends to decrease in this case, the yaw rate calculating unit calculates YrMin=Yr in order to process the current yaw rate Yr as the peak value of this steering in the control afterward.

In the vehicle behavior controlling apparatus 120 described above, when the stabilization braking is performed, the yaw rate Yr acquired by the yaw rate acquiring unit 85 in the stabilization braking and the Yr-convergence determination threshold value YrTh calculated by the yaw rate calculating unit 122 are compared, whereby it is determined whether or not the yaw rate Yr decreases from the peak value by the predetermined amount or more. When it is determined from the comparison that the yaw rate Yr acquired by the yaw rate acquiring unit 85 decreases from the peak value of the yaw rate Yr by the predetermined amount or more, the stabilization braking is ended. Specifically, the case in which the yaw rate Yr decreases from the peak value by the predetermined amount or more indicates that the yaw rate Yr tends to decrease, which means it can be determined that the steering is returned to the neutral position. Therefore, in this case, the stabilization braking is ended so as to be capable of preventing that the stabilization braking is unnecessarily maintained. Accordingly, even if the advancing direction of the vehicle 1 is close to the straight direction, the stabilization braking is maintained, and hence, it can be prevented that the unnecessary yaw moment is generated by the stabilization braking to allow the vehicle 1 to have unstable behavior. As a result, the stability in the behavior during the turning-back steering can more surely be enhanced.

The Yr-convergence determination threshold value YrTh, which is used for determining whether or not the yaw rate Yr decreases from the peak value by the predetermined amount or more, is calculated independently in case where the second steering in the turning-back steering is the left turn and in case where the second steering is the right turn, whereby whether the stabilization braking is maintained or not is determined by using the Yr-convergence determination threshold value YrTh that is calculated independently in the left turn and in the right turn. Thus, even in case where the second steering in the turning-back steering is the left turn or the right turn, whether or not the yaw rate Yr decreases from the peak value by the predetermined amount or more can more appropriately be determined, and whether the stabilization braking is maintained or not can more appropriately be determined. Therefore, whether the stabilization braking is maintained or not can appropriately be determined based upon the yaw rate Yr, which can prevent that the stabilization braking is unnecessarily maintained. Consequently, the stability in the behavior during the turning-back steering can more surely be enhanced.

In the above-mentioned vehicle behavior controlling apparatuses 2 and 120, the control amount for performing the pre-charge or the stabilization braking is calculated based upon the state amount of the behavior of the vehicle 1 such as the yaw rate Yr. However, the control amount may be a predetermined value that is set beforehand. The pre-charge and the stabilization braking are the controls that are executed before the behavior becomes greatly unstable, such as the case in which a spin is generated, in order not to cause the unstable behavior during the turn. Therefore, they do not have to be performed so as to correctly correspond to the state amount of the behavior, and they may generate the braking force to a degree in which the yaw moment during the turn can slightly be reduced.

In the vehicle behavior controlling apparatus 2 according to the first embodiment, the equation of ds=MAX(ds, dsL) is calculated, and the greater one of the control amount ds calculated from the current behavior and the previous control amount dsL is selected as the control amount ds so as to maintain the control amount for performing the stabilization braking. In the vehicle behavior controlling apparatus 120 according to the second embodiment, the equation of FRds=MAX(FRds, FRdsL) or FLds=MAX(FLds, FLdsL) is calculated, and the greater one of the FRds and FRdsL, or the greater one of the FLds and FLdsL is selected as the control amount FRds or FLds so as to maintain the control amount. However, the control amount for performing the stabilization braking may be maintained according to the other method. For example, the lower limit value of the control amount for the stabilization braking may be set, and when the stabilization braking is executed, the control amount during the control for the stabilization braking may be set to be not less than the lower limit value so as to impose the limitation on the amount of the reduction in the braking force, whereby the braking force may be maintained.

Specifically, the case of the vehicle behavior controlling apparatus 2 according to the first embodiment will be described. The lower limit value of the control amount is set beforehand as dsmin, and then, ds=MAX(ds, dsmin) is calculated, whereby the greater one of the control amount ds calculated from the current behavior and the lower limit value dsmin of the control amount is selected as the control amount ds, resulting in that the control amount ds is set to be not less than the lower limit value dsmin. When the lower limit value of the control amount is set as described above, it can be prevented that the control amount excessively decreases during when the steering angle in the second steering during the turning-back steering is held. Therefore, the reduction amount of the control amount can be reduced. Therefore, when the stabilization braking is executed, the amount of the reduction in the braking force during when the steering angle in the second steering during the turning-back steering is held can be reduced, whereby the braking force in the stabilization braking can be maintained with the magnitude not less than the predetermined value. In the vehicle behavior controlling apparatus 120 according to the second embodiment, the lower limit values are similarly set as FRdsmin and FLdsmin beforehand, and the equation of FRds=MAX(FRds, FRdsmin) or FLds=MAX(FLds, FLdsmin) is calculated, whereby the braking force in the stabilization braking can be maintained with the magnitude not less than the predetermined value. Accordingly, the stability in the behavior during the turning-back steering can more surely be enhanced.

In the above-mentioned vehicle behavior controlling apparatuses 2 and 120, the steering state determining unit 98 determines whether or not the steering angle in the second steering during the turning-back steering is held based upon the stabilization braking once-execution flag F1 and the state of the absolute value absStr of the steering angle. However, this determination may be made based upon the factors other than the stabilization braking once-execution flag F1 and the state of the absolute value absStr of the steering angle. Since the stabilization braking is performed in case where the steering angle in the second steering during the turning-back steering is held, regardless of the determination method, the stability in the behavior during the turning-back steering can be enhanced.

In the above-mentioned vehicle behavior controlling apparatuses 2 and 120, when the behavior stabilization control is not executed, the brake device 30 generates the oil pressure exerted on the wheel cylinder 61 by the pedal effort by a driver who makes a braking operation on the brake pedal 12. However, even when the behavior stabilization control is not executed, the brake device 30 may control the brake actuator 50 of the brake device 30 by the brake device controlling unit 88 to operate the brake actuator 50, thereby generating the oil pressure exerted on the wheel cylinder 61.

In the above-mentioned vehicle behavior controlling apparatuses 2 and 120, the brake device 30 is configured as the one that makes the braking operation by a so-called disk brake, wherein the brake device 30 includes the wheel cylinder 61 and the brake disk 65 in the vicinity of each wheel 5. However, the brake device 30 may be configured as the brake device 30 that makes the braking operation by a so-called drum brake, wherein the brake device 30 includes a brake drum and a brake shoe in the vicinity of the wheel 5.

Industrial Applicability

As described above, the vehicle behavior controlling apparatus according to the present invention is useful to a vehicle that can adjust braking force independently on each wheel, and particularly to the case in which the braking force is generated, regardless of a driver's breaking operation, for stabilizing the vehicle.

REFERENCE SIGNS LIST

1 VEHICLE
2, 120 VEHICLE BEHAVIOR CONTROLLING APPARATUS
5 WHEEL
6 FRONT WHEEL
7 REAR WHEEL
10 STEERING WHEEL
12 BRAKE PEDAL
21 EPS DEVICE
30 BRAKE DEVICE
50 BRAKE ACTUATOR
61 WHEEL CYLINDER
65 BRAKE DISK
71 BRAKE STROKE SENSOR
72 YAW RATE SENSOR
73 G SENSOR
74 WHEEL SPEED SENSOR
75 STEERING ANGLE SENSOR
80 ECU
81 PROCESSING UNIT
82 BRAKE STROKE AMOUNT ACQUIRING UNIT
83 STEERING ANGLE ACQUIRING UNIT
84 WHEEL SPEED ACQUIRING UNIT
85 YAW RATE ACQUIRING UNIT
86 LATERAL ACCELERATION ACQUIRING UNIT
87 YAW DIRECTION BEHAVIOR ESTIMATING UNIT
88 BRAKE DEVICE CONTROLLING UNIT
89 BEHAVIOR STABILIZATION CONTROL DETERMINING UNIT
90 PRE-CHARGE MODE SETTING UNIT
91 STABILIZATION BRAKING ALLOWANCE DETERMINING UNIT
92 STABILIZATION BRAKING MODE SETTING UNIT
93 STABILIZATION BRAKING MODE DETERMINING UNIT
94 STABILIZATION BRAKING FLAG SETTING UNIT
95 STABILIZATION BRAKING FLAG DETERMINING UNIT
96 FLAG ELAPSED TIME CALCULATING UNIT
97 INHIBITION TIME LAPSE DETERMINING UNIT
98 STEERING STATE DETERMINING UNIT
99 STEERING DIRECTION DETERMINING UNIT
100 STABILIZATION BRAKING MAINTENANCE DETERMINING UNIT
110 STORAGE UNIT
111 INPUT/OUTPUT UNIT
121 YAW RATE DETERMINING UNIT
122 YAW RATE CALCULATING UNIT
123 STEERING ANGLE MAINTENANCE ELAPSED TIME CALCULATING UNIT
124 STEERING ANGLE MAINTENANCE ELAPSED TIME DETERMINING UNIT
125 STEERING ANGLE MAINTENANCE DETERMINATION FLAG SETTING UNIT
126 STEERING ANGLE MAINTENANCE DETERMINATION FLAG DETERMINING UNIT

The invention claimed is:

1. A vehicle behavior controlling apparatus comprising:
a steering state determining unit configured to determine a state of steering by a driver, including a state of turning-back steering where a first steering turns a wheel in a first left or right direction and is followed by a second steering which turns the wheel in a second right or left direction such that the first and second directions are reverse steering directions;
a yaw rate acquiring unit to acquire a yaw rate during a travel of the vehicle; and
a brake device controlling unit configured to control braking force applied to a wheel by controlling a brake device which generates the braking force, the brake device being configured to execute a stabilization braking, including:
(a) when the turning-back steering is determined as being executed by the steering state determining unit, the brake device controlling unit generates a predetermined braking force on a front wheel at a side reverse to the second direction of the second steering, and
(b) when a steering angle in the second steering is determined as being held by the steering state determining unit, the brake device controlling unit limits an amount of a reduction in the braking force, wherein
the amount of the reduction in the braking force is limited, to execute the stabilization braking, when the steering angle in the second steering of the turning-back steering is determined to be held,
the steering state determining unit determines that the steering angle in the second steering during the turning-back steering is being held when: (1) the turning-back steering is being executed, (2) the steering angle is greater than a predetermined value, and (3) a change of the steering angle is less than a predetermined change,
the brake device controlling unit executes the stabilization braking during a braking when a steering angle in the second steering is being held,
the brake device controlling unit, during a period when the stabilization braking is executed, ends the stabilization braking when the yaw rate, which is acquired by the yaw rate acquiring unit during the stabilization braking, is reduced from a peak value of the yaw rate by a predetermined amount or more.

2. The vehicle behavior controlling apparatus according to claim 1, wherein
the brake device controlling unit compares a current control amount in a control of the current stabilization braking and a previous control amount of the current control amount in the current stabilization braking, and selects the greater control amount as the current control amount, thereby maintaining the braking force, when the stabilization braking is executed.

3. The vehicle behavior controlling apparatus according to claim 1, wherein
the brake device controlling unit sets a lower limit value of the control amount for the stabilization braking, and sets the control amount in a control of the stabilization braking to be not less than the lower limit value, thereby maintaining the braking force, when the stabilization braking is executed.

4. The vehicle behavior controlling apparatus according to claim 1, wherein the yaw rate acquiring unit sets, during a first turn, a peak yaw rate that is a greatest yaw rate during the first turn.

5. The vehicle behavior controlling apparatus according to claim 4, wherein the yaw rate acquiring unit updates the peak yaw rate to reflect, during turns that follow the first turn, a peak yaw rate that is a greatest yaw rate during the first turn and the turns that follow the first turn.

6. The vehicle behavior controlling apparatus according to claim 4, wherein the yaw rate acquiring unit sets a peak yaw rate independently for left and right turns.

7. The vehicle behavior controlling apparatus according to claim 4, wherein the brake device controlling unit, during the period when the stabilization braking is executed, ends the stabilization braking when the yaw rate exceeds the peak yaw rate that is set by the yaw rate acquiring unit and the yaw rate is reduced by the predetermined amount or more.

* * * * *